US008377531B2

(12) United States Patent
Lyublinski et al.

(10) Patent No.: US 8,377,531 B2
(45) Date of Patent: **\*Feb. 19, 2013**

(54) SYSTEMS AND METHODS FOR PREVENTING AND/OR REDUCING CORROSION IN VARIOUS TYPES OF TANKS CONTAINERS AND CLOSED SYSTEMS

(75) Inventors: Efim Ya Lyublinski, Solon, OH (US); Donald A Kubik, Dickinson, ND (US)

(73) Assignee: Northern Technologies International Corporation, Beachwood, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/199,750

(22) Filed: Sep. 8, 2011

(65) Prior Publication Data

US 2012/0009082 A1   Jan. 12, 2012

Related U.S. Application Data

(60) Continuation of application No. 11/429,693, filed on May 8, 2006, now Pat. No. 8,017,203, which is a division of application No. 10/191,247, filed on Jul. 8, 2002, now abandoned.

(60) Provisional application No. 60/308,750, filed on Jul. 30, 2001.

(51) Int. Cl.
| | |
|---|---|
| *B29D 22/00* | (2006.01) |
| *B29D 23/00* | (2006.01) |
| *B32B 15/08* | (2006.01) |
| *B32B 15/085* | (2006.01) |
| *B65B 29/00* | (2006.01) |
| *B65B 31/02* | (2006.01) |
| *C23F 11/02* | (2006.01) |

(52) U.S. Cl. ............... 428/35.7; 428/34.1; 428/35.8; 428/35.9; 428/36.92; 53/402; 53/432; 422/9

(58) Field of Classification Search ............... 428/34.1, 428/35.7, 35.8, 35.9, 36.5, 36.92; 53/402, 53/432; 422/9, 10
See application file for complete search history.

(56) References Cited

U.S. PATENT DOCUMENTS

| | | | |
|---|---|---|---|
| 4,275,835 A | 6/1981 | Miksic et al. | |
| 5,019,341 A | 5/1991 | Niu et al. | |
| 5,024,268 A | 6/1991 | Cheadle et al. | |
| 5,494,191 A | 2/1996 | Benson | |
| 6,102,230 A | 8/2000 | Gould | |
| 6,111,187 A | 8/2000 | Goyette | |
| 6,131,443 A | 10/2000 | Duncan | |
| 6,551,552 B1 | 4/2003 | Lyublinski et al. | |
| 8,017,203 B2 * | 9/2011 | Lyublinski et al. | 428/34.1 |

* cited by examiner

*Primary Examiner* — Walter B Aughenbaugh
(74) *Attorney, Agent, or Firm* — Hudak, Shunk & Farine Co. LPA

(57) ABSTRACT

The present invention relates to methods for preventing and/or reducing the occurrence of corrosion in a variety of articles including, but not limited to, tanks (e.g., storage tanks, septic tanks, fuel tanks, etc.); containers (e.g., shipping containers, storage containers, etc.); semi-closed systems (e.g., fuel systems, septic systems, reservoirs, etc.); and/or closed systems (e.g., waste disposal systems, waste disposal drums or containers, etc.). In another embodiment, the methods of the present invention may be utilized to reduce and/or prevent corrosion in a variety of pipelines (e.g., gas/oil pipelines, water pipelines, sewage lines, etc.). More specifically, the present invention relates to methods for preventing and/or reducing the occurrence of corrosion in a variety of articles including, but not limited to, metallic tanks; metallic containers; pipelines; semi-closed systems; and/or closed systems which are constructed partially or totally from metal. (e.g., steel, iron, copper, brass, aluminum, etc.).

8 Claims, 23 Drawing Sheets

SYSTEMS AND METHODS FOR PREVENTING AND/OR REDUCING CORROSION IN VARIOUS TYPES OF TANKS CONTAINERS AND CLOSED SYSTEMS

CROSS REFERENCE

This application is a Continuation application of application Ser. No. 11/429,693, filed May 8, 2006, now U.S. Pat. No. 8,017,203, which was a Divisional application of U.S. Ser. No. 10/191,247, filed Jul. 8, 2002, now abandoned, which in turn claims the benefit of U.S. Provisional application No. 60/308,750, filed Jul. 30, 2001, entitled "Systems and Methods for Preventing and/or Reducing Corrosion in Various Types of Tanks, Containers and Closed Systems", all of which are hereby incorporated herein by reference in their entirety.

FIELD OF THE INVENTION

The invention herein described relates generally to systems, devices or methods for preventing and/or reducing the occurrence of corrosion in a variety of articles including, but not limited to, tanks (e.g., storage tanks, septic tanks, fuel tanks, etc.); containers (e.g., shipping containers, storage containers, etc.); semi-closed systems (e.g., fuel systems, septic systems, reservoirs, etc.); and/or closed systems (e.g., waste disposal systems, waste disposal drums or containers, etc.). In another embodiment, the devices and/or methods of the present invention may be utilized to reduce and/or prevent corrosion in a variety of pipelines (e.g., gas/oil pipelines, water pipelines, sewage lines, etc.). More specifically, the present invention relates to systems, devices or methods for preventing and/or reducing the occurrence of corrosion in a variety of articles including, but not limited to, metallic tanks; metallic containers; pipelines; semi-closed systems; and/or closed systems which are constructed partially or totally from metal (e.g., steel, iron, copper, brass, aluminum, etc.).

BACKGROUND OF THE INVENTION

In commerce and industry today, the useful life of corrodible items may be extended and/or preserved by providing corrosion inhibitors which protect the corrodible item from the adverse effects of its ambient environment. Among the common indications of corrosion manifested in useful metallic articles are oxidation, pitting, tarnishing, mottling or discoloration of the surfaces of these items. These manifestations occur in metallic articles, particularly when exposed to oxygen, water or other corrosive environments, in either gaseous or liquid phase. Additionally, sulfides and/or chlorides (or chlorine) may cause corrosion or tarnishing problems as well. In as much as both oxygen and water, including water vapor, occur normally and are available in nature, it is normally necessary to take precautions against corrosion in a variety of metallic based containers, shippers, storage tanks, tanker ships, gas tanks, septic systems (including the tank), etc. Metals which are frequently found to be susceptible to corrosion under normal atmospheric and ambient conditions include, but are not limited to, iron, copper, brass, aluminum, silver, and alloys of these metals.

In view of the widespread need for protecting various metallic based tanks, containers, semi-closed systems, and/or closed systems from corrosion, a variety of systems have been utilized. Such anti-corrosion systems often employ one or more of the following as components or sub-components thereof: (1) a cathodic protection system; (2) a liner system which coats the inside of the tank, container and/or closed system and/or (3) an inert atmosphere.

Such methods, although effective, are not suitable for all tanks, containers, pipelines and/or closed systems which may need to be protected. Additionally, such methods have service lives which are not suitable for applications in which a long service life is necessary, for example, the use of cathodic systems to protect the cargo tanks of ocean liners which carry petroleum products. Furthermore, the replenishment of certain currently used systems, such as cathodic systems, is both expensive and difficult.

SUMMARY OF THE INVENTION

The invention herein described relates generally to systems, devices or methods for preventing and/or reducing the occurrence of corrosion in a variety of articles including, but not limited to, tanks (e.g., storage tanks, septic tanks, fuel tanks, etc.); containers (e.g., shipping containers, storage containers, etc.); semi-closed systems (e.g., fuel systems, septic systems, reservoirs, etc.); and/or closed systems (e.g., waste disposal systems, waste disposal drums or containers, etc.). In another embodiment, the devices and/or methods of the present invention may be utilized to reduce and/or prevent corrosion in a variety of pipelines (e.g., gas/oil pipelines, water pipelines, sewage lines, etc.). More specifically, the present invention relates to systems, devices or methods for preventing and/or reducing the occurrence of corrosion in a variety of articles including, but not limited to, metallic tanks; metallic containers; pipelines; semi-closed systems; and/or closed systems which are constructed partially or totally from metal (e.g., steel, iron, copper, brass, aluminum, etc.).

In accordance with one aspect of the invention, a corrosion inhibiting device comprising: a capsule having at least one sealable enclosure therein; at least one corrosion inhibitor, wherein the at least one corrosion inhibitor is contained in the sealable enclosure; and at least one means for delivering the at least one corrosion inhibitor from the at least one sealable enclosure of the capsule to an outside environment, wherein the capsule is formed from a non-degradable material.

In accordance with another aspect of the invention, a corrosion inhibiting device comprising: a capsule having at least one sealable enclosure therein, wherein the capsule is formed from a non-degradable material; at least one degradable layer which contains therein at least one corrosion inhibitor which is formed within the at least one sealable enclosure of the capsule; and at least one degradable layer which contains no corrosion inhibitor which is formed within the at least one sealable enclosure of the capsule, wherein the at least one degradable layer which contains at least one corrosion inhibitor and the at least one degradable layer which contains no corrosion inhibitor are formed in alternating layers with the proviso that at least one degradable layer which contains no corrosion inhibitor is the outer most layer within the at least one sealable enclosure of the capsule.

In accordance with another aspect of the invention, a corrosion inhibiting device comprises: a capsule having at least two discrete degradable polymer layers, wherein at least one degradable layer contains therein at least one corrosion inhibitor and at least one degradable layer contains therein no corrosion inhibitor, wherein the at least one degradable layer which contains therein at least one corrosion inhibitor and the at least one degradable layer which contains therein no corrosion inhibitor are formed in an alternating manner.

In accordance with another aspect of the invention, a method for protecting a tank, container, pipeline, semi-closed system or closed system comprises the step of: placing a suitable corrosion inhibiting device within the interior of the tank, container, pipeline, semi-closed system or closed system.

In accordance with another aspect of the invention, a method for protecting a tank, container, pipeline, semi-closed system or closed system comprises the steps of: (A) placing a corrosion inhibiting device into the interior of a tank, container, pipeline, semi-closed system or closed system, wherein the corrosion inhibiting device comprises: a capsule having at least one sealable enclosure therein; at least one corrosion inhibitor, wherein the at least one corrosion inhibitor is contained in the sealable enclosure; and at least one means for delivering the at least one corrosion inhibitor from the at least one sealable enclosure of the capsule to an outside environment, wherein the capsule is formed from a non-degradable material; and (B) closing or sealing the tank, container, pipeline, semi-closed system or closed system.

In accordance with another aspect of the invention, a corrosion inhibiting device comprises: a shell; and a VCI-containing foam (i.e., volatile or vapor phase corrosion inhibitor-containing foam) which is contained within the shell, wherein the VCI-containing foam has formed therein at least one hole so as to increase the surface area of the VCI-containing foam.

To the accomplishment of the foregoing and related ends, the invention, then, comprises the features hereinafter fully described and particularly pointed out in the claims. These embodiments are indicative, however, of but a few of the various ways in which the principles of the invention may be employed. Other objects, advantages and features of the invention will become apparent from the following detailed description of the invention.

DETAILED DESCRIPTION OF THE INVENTION

Figure 1:
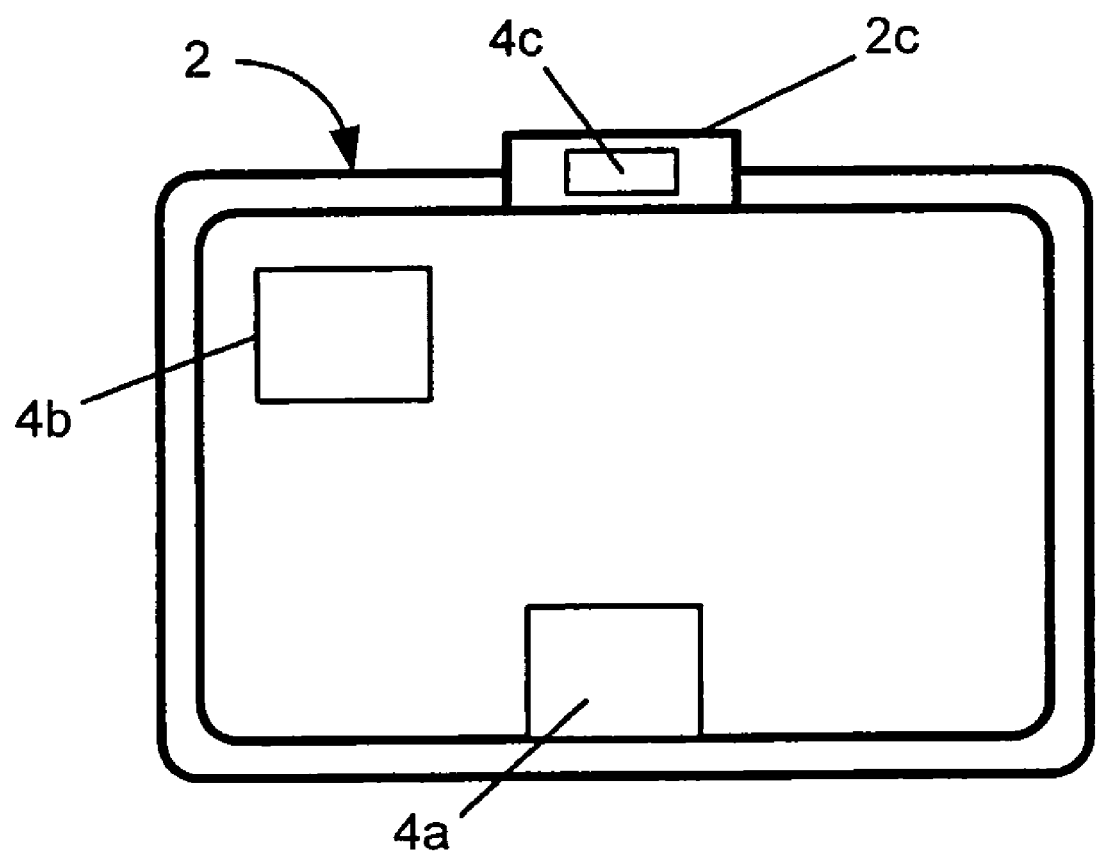
FIG. 1 illustrates a number of devices according to numerous embodiments of the present invention which have been placed into a tank in order to provide increased corrosion protection.

The invention herein described relates generally to systems, devices or methods for preventing and/or reducing the occurrence of corrosion in a variety of articles including, but not limited to, tanks (e.g., storage tanks, septic tanks, fuel tanks, etc.); containers (e.g., shipping containers, storage containers, etc.); semi-closed systems (e.g., fuel systems, septic systems, reservoirs, etc.); and/or closed systems (e.g., waste disposal systems, waste disposal drums or containers, etc.). In another embodiment, the devices and/or methods of the present invention may be utilized to reduce and/or prevent corrosion in a variety of pipelines (e.g., gas/oil pipelines, water pipelines, sewage lines, etc.). More specifically, the present invention relates to systems, devices or methods for preventing and/or reducing the occurrence of corrosion in a variety of articles including, but not limited to, metallic tanks; metallic containers; pipelines; semi-closed systems; and/or closed systems which are constructed partially or totally from metal (e.g., steel, iron, copper, brass, aluminum, etc.).

As used throughout the text and claims, a semi-closed system means a system which is opened periodically to replenish, fill or deposit something therein (e.g., a fuel tank). As used throughout the text and claims, corrosion inhibitor means any compound, whether volatile or not, which inhibits at least one form of corrosion or degradation from occurring on an object to be protected. As used throughout the text and claims, volatile or vapor phase corrosion inhibitor means that the volatile/vapor phase corrosion inhibitor is transferred to the surface of the item/article/surface to be protected by condensation of the volatile/vapor phase corrosion inhibitor's vapor on the surface of the item/article/surface to be protected.

As used throughout the text and claims, a sealable enclosure means any enclosure which can be sealed by any suitable means so as to maintain a high concentration of one or more corrosion inhibiting compounds remote from an exterior environment until the release of the one or more corrosion inhibiting compounds into the exterior environment to the sealable enclosure is desired. Additionally, it should be noted that in the following text, range and/or ratio limits may be combined.

The present invention relates to devices or capsules which can be placed in tanks; containers; pipelines, semi-closed systems; and/or closed systems which are constructed partially or totally from metal. The devices of the present invention are in general closed packages or capsules which contain therein one or more corrosion inhibitors (be they volatile or otherwise) or a corrosion inhibiting film and are constructed from any suitable material, such as metal (e.g., stainless steel, aluminum, etc.) or a suitable polymeric material (e.g., polyolefin polymers such as polyethylene, polypropylene, ethylene/vinyl acetate copolymers, vinyl acetate/vinyl chloride copolymers and polyvinyl chloride). In another embodiment, the devices of the present invention contain one or more layers of corrosion inhibiting films interspersed with layers of polymer films which contain no corrosion inhibitor.

Any suitable corrosion inhibitor can be used in the present invention. U.S. Pat. Nos. 4,290,912; 5,320,778; and 5,855,975 disclose vapor phase or volatile corrosion inhibitors and are incorporated herein by reference in their entirety for their teachings of such compounds. For example, useful vapor phase or volatile corrosion inhibitors include, but are not limited to, benzotriazole, and mixtures of benzoates of amine salts with benzotriazole, nitrates of amine salts, and $C_{13}H_{26}O_2N$.

In another embodiment, non-volatile corrosion inhibitors can be utilized in the present invention. Examples of such compounds include, but are not limited to, phosphonates, phosphates, borates, chromates, molybdates (e.g., anhydrous sodium molybdate and mixtures of such molybdates with sodium nitrite) and silicates. When a non-volatile corrosion inhibitor is employed in the present invention, the solubility of the one or more non-volatile corrosion inhibitors in water may not be of great importance in the selection thereof.

In still another embodiment, the present invention can employ a combination of one or more volatile corrosion inhibitors with one or more non-volatile corrosion inhibitors.

The devices of the present invention can be used to protect against a wide variety of corrosive compounds and/or atmospheres. Such compounds/atmospheres include, but are not limited to, water (either liquid or vapor phase), oxygen, sulfides, chlorides, $NO_X$ or chlorine.

The devices of the present invention can be placed in any desired tank, container, pipelines, semi-closed system or closed system in a variety of manners. In one embodiment, the devices of the present invention are placed within the desired enclosure prior to filling the enclosure with the substance to be stored therein (e.g., gas, oil, water, etc.). In such an embodiment, the devices of the present invention can be free floating (i.e., able to move freely about the inside of the tank due to a neutral buoyancy), have a positive buoyancy so as to float at the top of the desired enclosure or have a negative buoyancy so as to sink either partially or completely to the bottom of the tank.

In another embodiment, the devices of the present invention can be attached by any suitable means to the bottom (or interior surface) of the desired enclosure/article to be protected. Such attachment means include, but are not limited to, bolts, screws, rivets, chemical attachment means (e.g., glue, epoxy, etc.) or magnets. In another embodiment, if the devices of the present invention are formed either completely or partially from metal and the place where the devices are to be placed is suitable, the devices of the present invention can be welded into place. For example, in oil tankers a device according to the present invention could be attached to the bottom of the hull of the ship within the cargo compartments. This would permit the devices of the present invention to remain at the bottom to counteract any water present at the bottom of the cargo compartments.

In one embodiment, the attachment means is a magnet. A magnetic attachment means is advantageous in that it facilitates easy replacement of the devices of the present invention should the corrosion inhibiting portion thereof become exhausted.

In yet another embodiment, the devices of the present invention are incorporated into the cover and/or cap of the tank, container, pipelines, semi-closed system or closed system in which corrosion protection is desired. For example, in a vehicle fuel system, a device according to the present invention can be placed in the fuel tank cap.

The devices of the present invention permit the release of one or more corrosion inhibitors into a desired environment over an extended period of time. Accordingly, the devices of the present invention do not have a set life expectancy. For example, the devices of the present invention could be designed to last any where from about 1 month to about 10 years. In another embodiment, the life expectancy of the devices of the present invention is from about 6 months to about 5 years, of about 1 year to about 3 years. It will be apparent to one of ordinary skill in the art, upon reading the present specification, that the devices according to the present invention could be produced with an infinite range of life expectancies. As such, the present invention is not limited to the above life expectancies. Rather, one of ordinary skill in the art would, upon reading the present specification and taking into consideration the environment in which the device will be placed, be able to design a device according to the present invention with any desired life expectancy.

The devices of the present invention deliver corrosion inhibitor to the environment in which they are placed by any suitable delivery means. Such delivery means include, but are not limited to, one way diaphragms, two way diaphragms, semi-permeable membranes, valves (e.g., pressure sensitive valves, electronic valves, etc.) which allow the passage of corrosion inhibitor out of the device but prevent the inflow of the liquid or vapor phase environment which surrounds the device, a decomposable metal or polymeric plug or a decomposable corrosion inhibitor impregnated polymer film. In another embodiment, if an electronic valve is incorporated into the devices according to the present invention, the electronic valve can be constructed so as to release corrosion inhibitor at regular intervals and/or in regular amounts. For example, an electronic valve could be set to release corrosion inhibitor from a device according to the present invention once every day, week, month or year. Alternatively, an electronic valve could be set to release corrosion inhibitor every other day, week, month or year. It should be noted, that the present invention is not limited to any one interval scheme. Rather, if incorporated in the devices according to the present invention, an electronic valve can be set to dispense corrosion inhibitor at any given regular or irregular interval.

In another embodiment, the devices according to the present invention can contain therein a sensor for detecting the concentration of various corrosive environments. In response to a certain threshold pressure or concentration of corrosive gas, corrosive liquid, corrosive ions, etc., the sensor instructs the electronic valve to release corrosion inhibitor for a certain amount of time. In another embodiment, the electronic valve is equipped with a flow meter and can dispense any desired amount of corrosion inhibitor (be it liquid or gas).

Such an electronic valve is useful in situations where a known amount of corrosive material collects (or forms) over a given period of time.

In yet another embodiment, the devices according to the present invention can incorporate therein dissolvable or degradable plugs which dissolve or degrade in the presence of one or more corrosive elements over time or dissolve or degrade in a given environment. For example, a polymeric plug which is soluble in water could be used in the cargo compartment of an oil tanker. Thus, the presence of water would dissolve the plug and release corrosion inhibitor into the oil to prevent the water present from damaging the storage tank or oil compartment of a tanker ship. In another embodiment, the degradable plug could be made of a metal which breaks down quickly in the presence of oxygen (e.g., magnesium).

The present invention will now be described in relationship to specific embodiments as shown in the attached Figures. It should be noted that the present invention is not only limited to those embodiments shown in the attached Figures. Rather, the present invention should be broadly construed. In the Figures, like reference numerals refer to like parts.

Referring to FIG. 1, a general depiction of the present invention is shown. As shown in FIG. 1, a double walled tank 2 has placed inside (represented by reference numerals 4a and/or 4b) therein one or more devices according to the present invention. The tank further includes a hatch, cap, cover or lid 2c. In one embodiment, the devices of the present invention can be secured to any portion of the interior wall of the tank (e.g., a side wall, the top or the bottom) by any suitable means (e.g., epoxy, welding, rivets, screws, bolts, magnets, etc.) (device 4a of FIG. 1). In another embodiment, the devices of the present invention can be permitted to float within the confines of tank 2 (device 4b of FIG. 1). In still another embodiment, the devices of the present invention can be designed so as to reside within the lid, cap, cover or hatch of the tank 2 (device 4c of FIG. 1). In yet another embodiment, any combination of secured devices 4a, free floating devices 4b and cap devices 4c can be utilized in tank 2.

As will be apparent from the following discussion, devices 4a, 4b and/or 4c can be selected, as needed, from any one or more of devices 200, 300, 400, 400a, 400b, 400c, 500a, 500a', 500b, 500c, 500d, 600a, 600b, 600c, 700a, 700b, 700c, 800a, 800b, 800c, 900, 1000, 1100a, 1100b and/or 1200 of the present invention as discussed below in connection with the various Figures. In yet another embodiment, a device according to the present invention can actually be a tank lid, cap, cover or hatch which contains therein at least one corrosion inhibitor and a delivery means. It should be noted that the present invention is not limited to just these embodiments, rather features from different embodiments can be combined to yield additional embodiments which, although not depicted, are within the scope of the present invention.

Figure 2A:
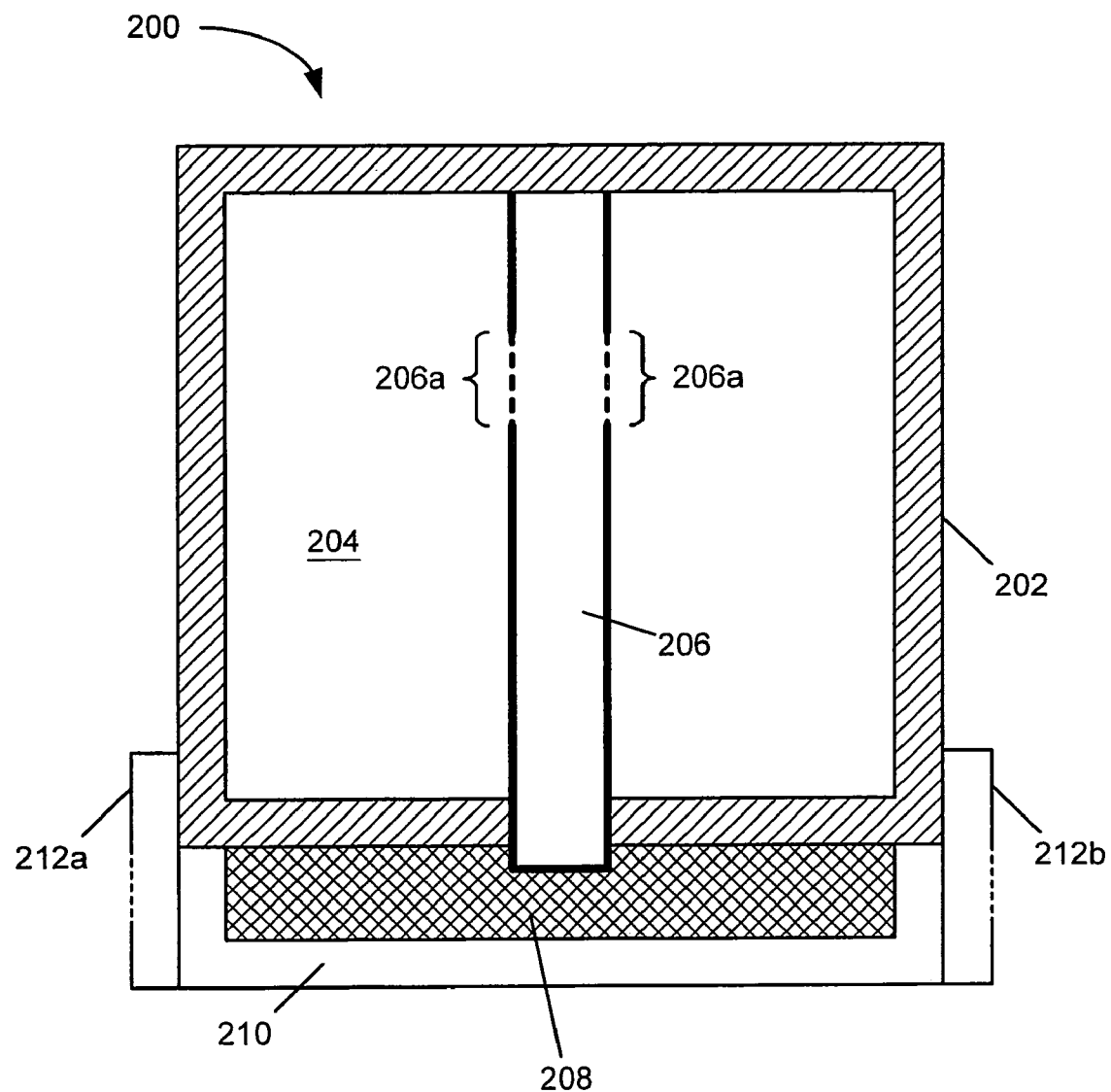
FIGS. 2A and 2B are cross-sectional views which illustrate one type of a corrosion protection system/device for tanks, containers, pipelines, semi-closed systems, and/or closed systems according to the present invention.

Referring to FIG. 2A, device 200 includes a capsule 202 formed from any suitable material. In one embodiment, capsule 202 is formed from any suitable non-degradable or corrosion resistant metal (e.g., stainless steel, aluminum, etc.). In another embodiment, capsule 202 is formed from a suitable non-degradable polymer composition (e.g., a polyolefin polymer). Although depicted as rectangular, capsule device 200 can be made in any shape (e.g., spherical, square, pyramidal, etc.). The inside of capsule 202 includes one or more suitable corrosion inhibitor 204 which is selected based upon the corrosive element or compound to be neutralized and a dispensing column 206. Corrosion inhibitor 204 flows into dispensing column 206 through one or more holes 206a therein. Alternatively, dispensing column 206 could be a wick, a semi-permeable membrane column or a column formed from any suitable material (such as metal or plastic) which contains therein one or more valves which permit the controlled escape of corrosion inhibitor 204 into the interior of the dispensing column 206. Additionally, device 200 includes a sealing member 208 and a cover 210. The cover 210 of device 200 is movable so as to allow the corrosion inhibitor 204 contained within the compartment of capsule 204 to escape from device 200 to the environment outside device 200. The escape path of the corrosion inhibitor is represented by the arrows in FIG. 2B. As shown in FIG. 2A, the corrosion inhibitor escapes from cover 210 through suitable holes or openings formed therein (represented by the dashed lines in tracks 212a and 212b).

In the embodiment depicted in FIG. 2A, cover 210 is mounted in tracks 212a and 212b so as to be slidable therein. In such a case, cover 210 can be moved from the closed position depicted in FIG. 2A to an open position depicted in FIG. 2B by applying a force to cover 210 in a direction away from the main body of device 200. This in turn opens the end of dispensing column 206 by moving sealing member 208 away from the end of dispensing column 206 and allows corrosion inhibitor 204 to escape from the inside of capsule 202 through any suitable escape means (e.g., holes, valves, etc.) in cover 210 and/or tracks 212a and 212b. In one embodiment, cover 210 can either be moved manually (i.e., by hand) prior to the placement of device 200 into the desired tank, container, pipeline, semi-closed system, and/or closed system or moved automatically by, for example, a piston (not pictured). If cover 210 is to be controlled automatically, device 200 can contain a suitable control mechanism (not pictured) which controls the intervals during which cover 210 is in the open position. If controlled automatically, device 200 can be set to release corrosion inhibitor 204 at any desired interval, be such intervals regular or otherwise.

Figure 2B:
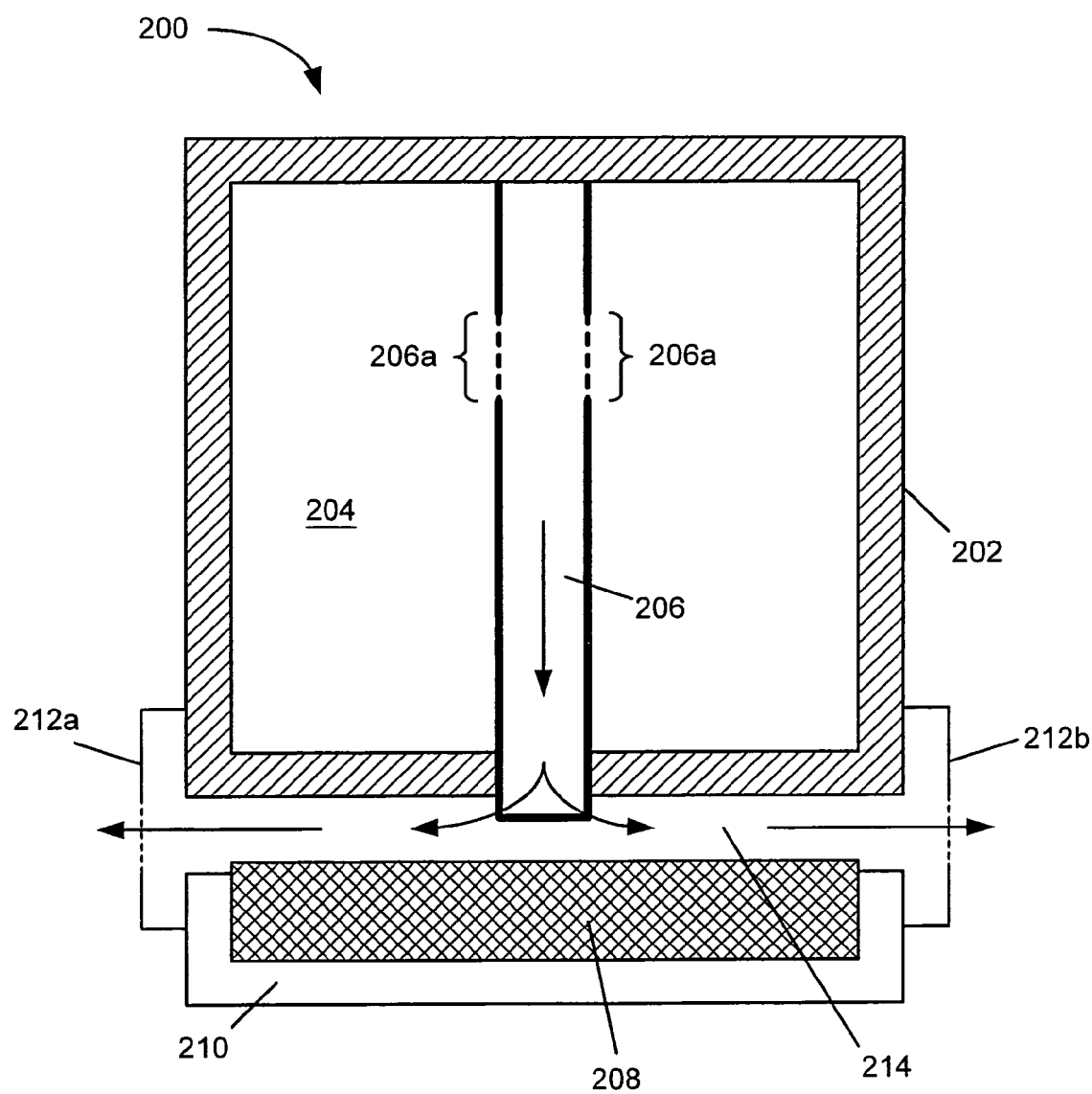

In another embodiment, cover 210 is a cap which is attached to the main body of device 200 via threads (not pictured). In this embodiment, cover 210 is rotated in either the counter-clockwise or clockwise direction so as to loosen the cover 210 and move sealing member 208 away from the end of dispensing column 206 can either be moved manually (i.e., by hand) prior to the placement of device 200 into the desired tank, container, pipeline, semi-closed system, and/or closed system. Once open, corrosion inhibitor 204 is free to flow out of the device 200 through any suitable opening formed in the cover 210 and/or tracks 212a and 212b which are formed therein just above the level of sealing member 208 as shown in FIGS. 2A and 2B. For example, as shown in FIG. 2B, corrosion inhibitor 204 flows out opening 214 after cover 210 and sealing member 208 have been moved away from the end of dispensing column 206.

Figure 3A:
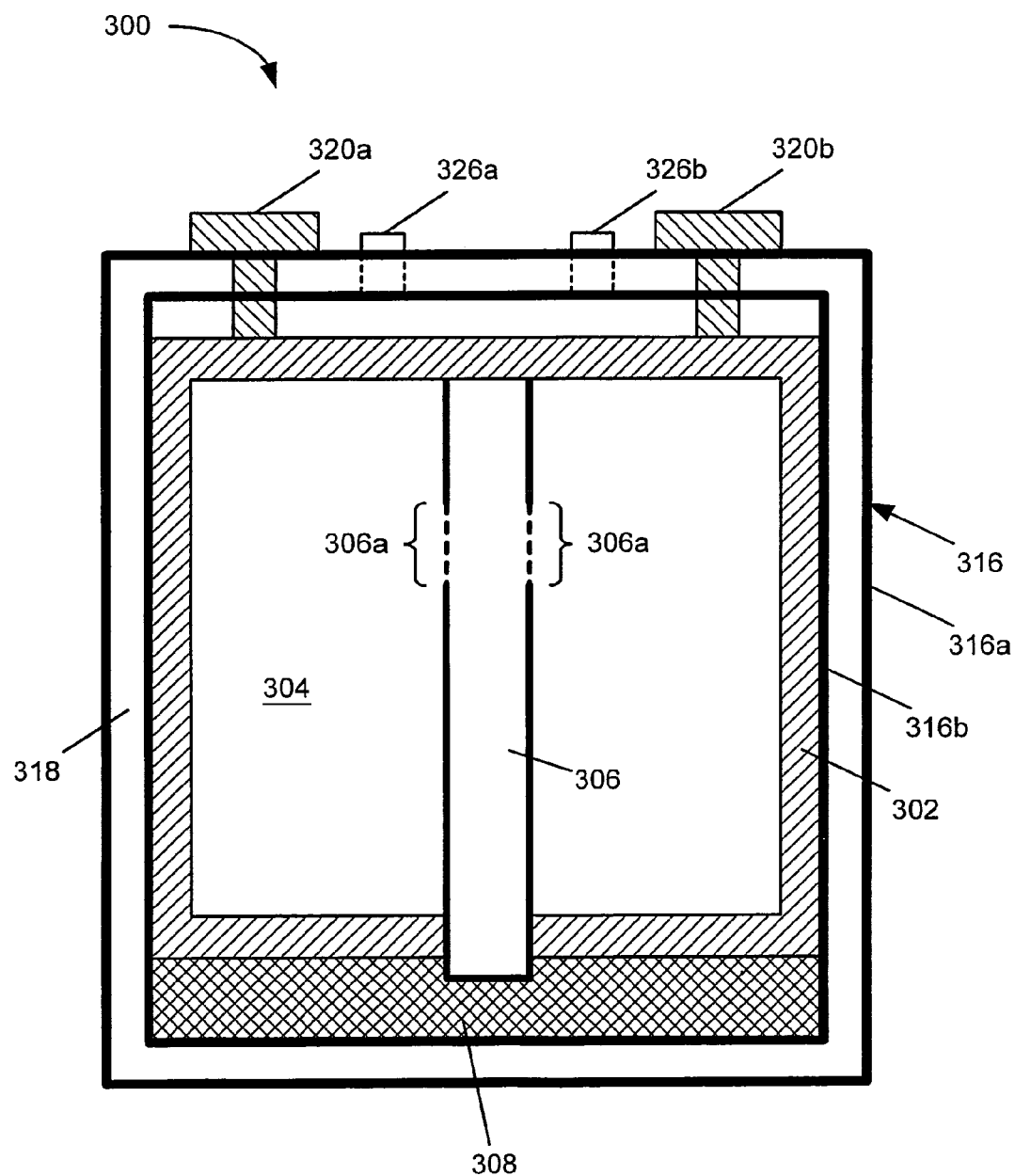
FIGS. 3A and 3B are cross-sectional views which illustrate another type of a corrosion protection system/device for tanks, containers, pipelines, semi-closed systems, and/or closed systems according to the present invention.
Figure 3B:
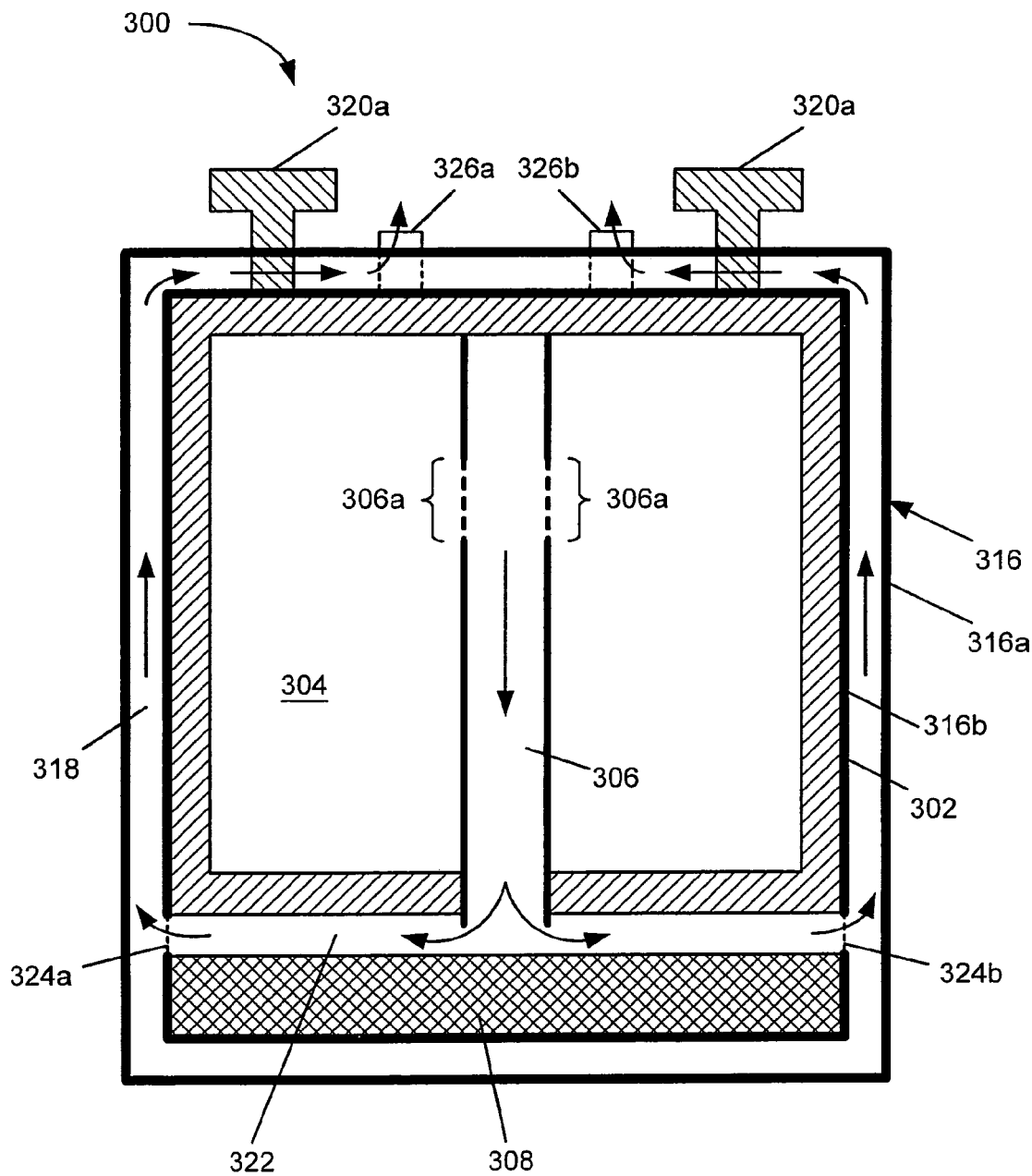

As is shown in FIGS. 3A and 3B, a device 300, which is similar to device 200 shown in FIGS. 2A and 2B, includes a capsule 302 formed from any suitable material, one or more corrosion inhibitors 304, a dispensing column 306, and a sealing member 308. In one embodiment, capsule 302 is formed from any suitable non-degradable or corrosion resistant metal (e.g., stainless steel, aluminum, etc.). In another embodiment, capsule 302 is formed from a suitable non-degradable polymer composition (e.g., a polyolefin polymer). Although depicted as rectangular, capsule device 300 can be made in any shape (e.g., spherical, square, pyramidal, etc.). The inside of capsule 302 includes a suitable corrosion inhibitor 304 which is selected based upon the corrosive element or compound to be neutralized and a dispensing column 306. Corrosion inhibitor 304 flows into dispensing column 306 through one or more holes 306a therein. Alternatively, dispensing column 306 could be a wick, a semi-permeable membrane column or a column formed from any suitable material (such as metal or plastic) which contains therein one or more valves which permit the controlled escape of corrosion inhibitor 304 into the interior of the dispensing column 306.

In this embodiment, the capsule 302 is placed within a double-walled outer capsule 316. Outer capsule 316 encases capsule 302 and is constructed to be slightly larger than capsule 302 in at least one dimension so that capsule 302 has freedom to move while encased therein. Furthermore, outer capsule 316 is constructed in such a manner that capsule 316 has two walls 316a and 316b which are spaced apart to yield a suitably sized gap 318. The size of the gap 318 between walls 316a and 316b is not critical so long as the gap is large enough to allow the desired amount of corrosion inhibitor 304 to exit the device 300 when the device is opened.

In one embodiment, device 300 is maintained in a closed state by actuators 320a and 320b. When actuators 320a and 320b are in their closed states (e.g., in a down position), the actuators exert a sufficient pressure on capsule 302 to force the end of dispensing column 306 into sealing member 308. Once actuators 320a and 320b have been moved, either manually or automatically, into an open state (e.g., by pulling the actuators up), capsule 302 rises within the outer capsule 316 thereby allowing corrosion inhibitor 304 to escape from the end of dispensing column 306 into opening 322 (FIG. 3B). In one embodiment, capsule 302 rises once actuators 320a and 320b have been moved to their open state due to positive buoyancy.

Once actuators 320a and 320b have been opened corrosion inhibitor 304 can flow through one or more openings, valves or diaphragms 324a and 324b in wall 316b of outer capsule 316 and into gap 318. Once inside of gap 318, the corrosion inhibitor 304 is permitted to escape from capsule 316 through any suitable opening therein. In one embodiment, corrosion inhibitor 304 escapes from outer capsule 316 through suitable valves 326a and 326b. In one embodiment, valves 326a and 326b are one way valves. This escape route for corrosion inhibitor 304 is shown by the arrows in gap 318 and opening 322. In another embodiment, corrosion inhibitor 304 can escape from outer capsule 316 through one or more openings formed in wall 316a of outer capsule 316 (not shown).

In another embodiment, device 200 or device 300 may further include a suitable means (e.g., a valve or a diaphragm) for replenishing the corrosion inhibitor 204/304 contained within capsule 202/302 (not shown).

Turning to FIGS. 4A to 4D, FIG. 4A depicts a device 400 according to another embodiment of the present invention. Device 400 includes a capsule 402 formed from any suitable non-degradable and/or corrosion resistant material. In one embodiment, capsule 402 is formed from any suitable metal (e.g., stainless steel, aluminum, etc.). In another embodiment, capsule 402 is formed from a suitable non-degradable polymer composition (e.g., a polyolefin polymer). The inside of capsule 402 includes one or more suitable corrosion inhibitor 404 which is selected based upon the corrosive element or compound to be neutralized. Capsule 402 has therein one or more openings 406 which are sealed with a degradable plug or cap 408. Upon exposure to a corrosive environment or corrosive element in an environment, the one or more degradable plugs or caps 408 degrade to allow the corrosion inhibitor 404 contained in device 400 to exit capsule 404 and neutralize the one or more corrosive elements that may exist outside device 400.

In one embodiment, each degradable plug or cap 408 is independently formed from any suitable material, such as a bio-degradable polymer composition, a polymer composition which is soluble in a given environment (e.g., a water soluble or oil soluble polymer) or a metal material which degrades or corrodes when exposed to a specific chemical compound (e.g., magnesium metal which reacts in the presence of oxygen). Upon exposure to a suitable element and/or environment, degradable plug or cap 408 degrades thereby allowing corrosion inhibitor 404 to escape through opening 406. It will be appreciated by those of skill in the art, that degradable plug or cap 408 can be designed so as to resist a certain amount of degradation prior to permitting the corrosion inhibitor contained in device 400 from escaping. That is, degradable plug or cap 408 may be designed so as to retain integrity (i.e., to not permit the escape of any amount of corrosion inhibitor contained in the device) for any desired period of time. In one embodiment, degradable plug or cap 408 is designed to retain integrity for about 1 hour to about 1 month, or from about 10 hours to about 2 weeks, or even from about 2 days to about 1 week.

Figure 4A:
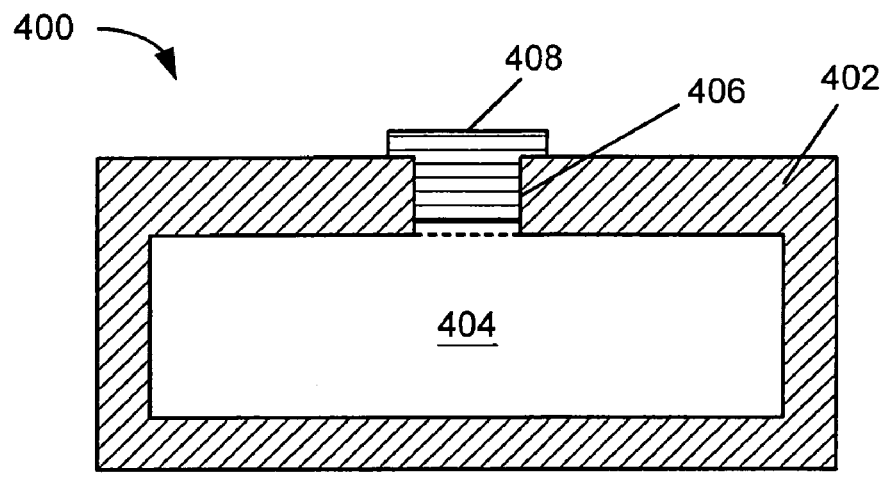
FIGS. 4A, 4B, 4C, 4C' and 4D are cross-sectional views which illustrate four different embodiments of another type of a corrosion protection system/device for tanks, containers, pipelines, semi-closed systems, and/or closed systems according to the present invention.
Figure 4B:
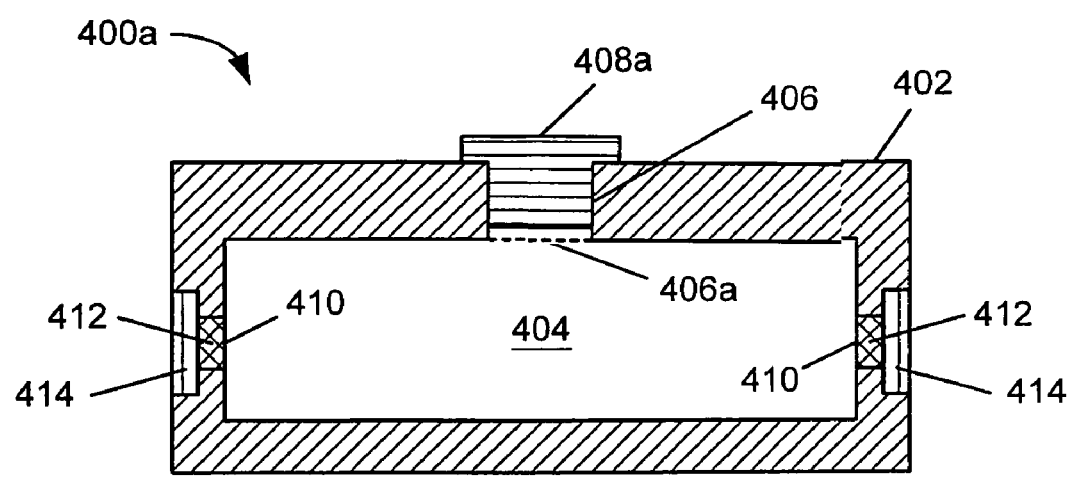

Referring to FIG. 4B, FIG. 4B depicts one variation of device 400 of FIG. 4A. As shown in FIG. 4B, device 400a, which is similar to device 400 shown in FIG. 4A, includes a capsule 402 formed from any suitable material, at least one corrosion inhibitor 404, an opening 406, and a plug or cap 408a. In this embodiment, plug or cap 408a may be formed from any suitable degradable or non-degradable material (e.g., a non-degradable polymer or suitable metal such as aluminum or stainless steel). If plug or cap 408a is formed from a non-degradable material, opening 406 can serve as a means by which to fill capsule 402 with corrosion inhibitor 404 with the dashed line 406a in FIG. 4B representing a diaphragm valve through which corrosion inhibitor 404 can be deposited into capsule 402 by using, for example, a syringe. Alternatively, the opening in capsule 402 represented by dashed line 406a need not be present.

Device 400a further includes one or more openings 410 (two are pictured in FIG. 4B) in capsule 402. Each opening 410 is sealed with a suitable valve 412 (for example, a one-way or two-way diaphragm valve). A degradable cover 414 is placed over each valve 412 to prevent the undesired or untimely escape of corrosion inhibitor 404 from capsule 402. The composition of degradable cover 414 is similar in nature to that of degradable plug or cap 408. As such, further discussion is hereby omitted.

Figure 4C:
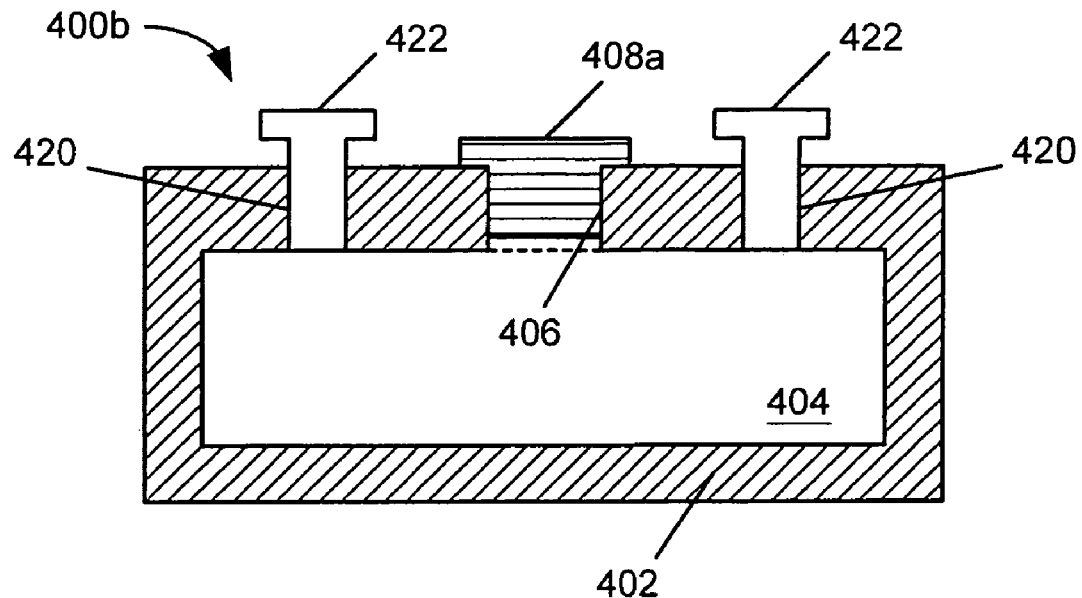
Figure 4C:
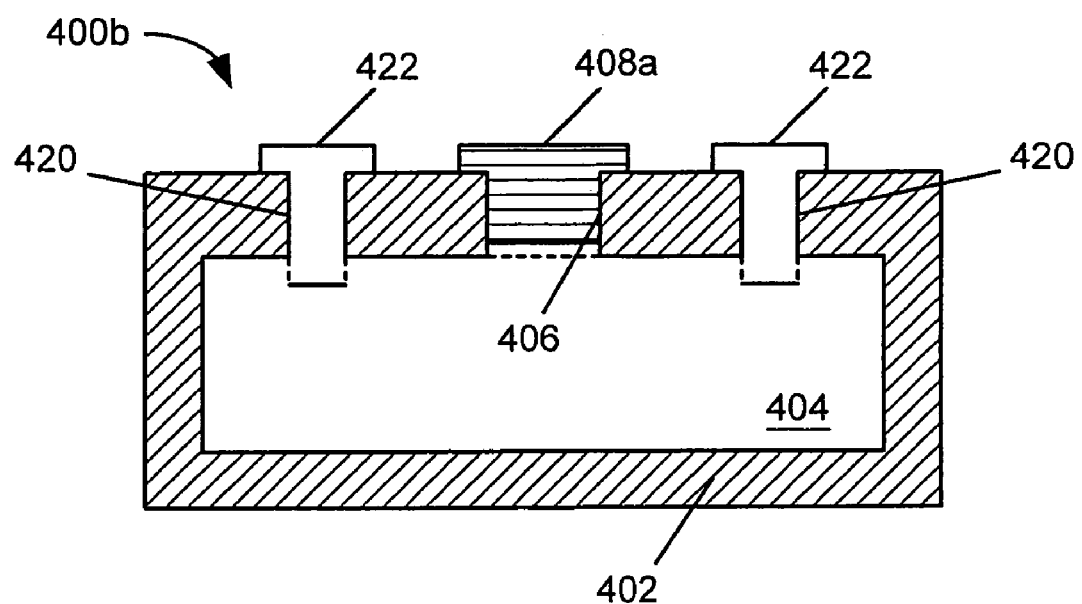

Referring to FIGS. 4C and 4C', a device 400b is depicted which includes a capsule 402 formed from any suitable material, at least one corrosion inhibitor 404, an opening 406, and a plug or cap 408a. In this embodiment, plug or cap 408a may be formed from any suitable degradable or non-degradable material (e.g., a non-degradable polymer or suitable metal such as aluminum or stainless steel). Device 400b further includes one or more openings 420 which contained therein a sealable one way vent or valve 422. When in the open position (FIG. 4C'), the one way vent or valve 422 allows corrosion inhibitor 404 to escape from capsule 402 into the surrounding environment (i.e., the inside of a tank, container, pipeline, semi-closed system or closed system). Depending upon the environment in which device 400b is placed, the one way vent or valve 422 can either be manually or automatically controlled. Such automatic venting systems and valves are known in the art and a discussion thereof is omitted.

Figure 4D:
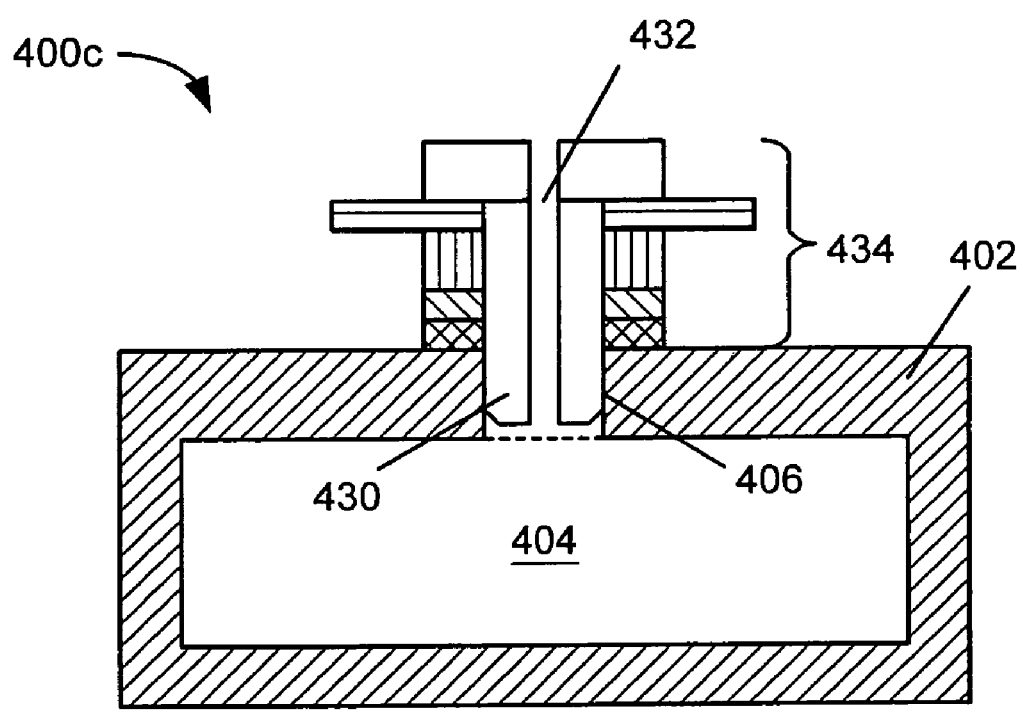

In another embodiment, the degradable plug or cap 408 of device 400 of FIG. 4A can be replaced by a diaphragm valve 430 which can be constructed so that the diaphragm valve 430 can be opened and closed either manually or automatically (see FIG. 4D). In one embodiment, device 400 can be sized accordingly to fit into the top portion of a gas tank cap, tank or container lid, or a hatch (see device 400c of FIG. 4D). In this case, the release of corrosion inhibitor 404 into the enclosed environment inside the tank, container, pipeline, semi-closed system or closed system can be controlled manually from outside of the tank, container, semi-closed system or closed system. For example, in a gas tank cap, capsule 402 of device 400c is placed into the top portion of the cap and a vent 432 is formed through the shank 434 (be it threaded or otherwise) of the gas cap in order to permit corrosion inhibitor 404 to escape from device 400c into the gas tank as needed or on a timed basis.

In general the devices described above with reference to FIGS. 2A to 4D are intended to be placed inside of a tank, container, pipeline, semi-closed system or closed system. Alternatively, such devices can be designed to fit into, if present, the lid, cover and/or hatch of any tank, container, pipeline, semi-closed system or closed system. Any of these devices can further be attached permanently or semi-permanently to the inside of a tank, container, pipeline, semi-closed system or closed system via any suitable means (e.g., rivets, screws, bolts, welded, etc.).

Figure 5A:
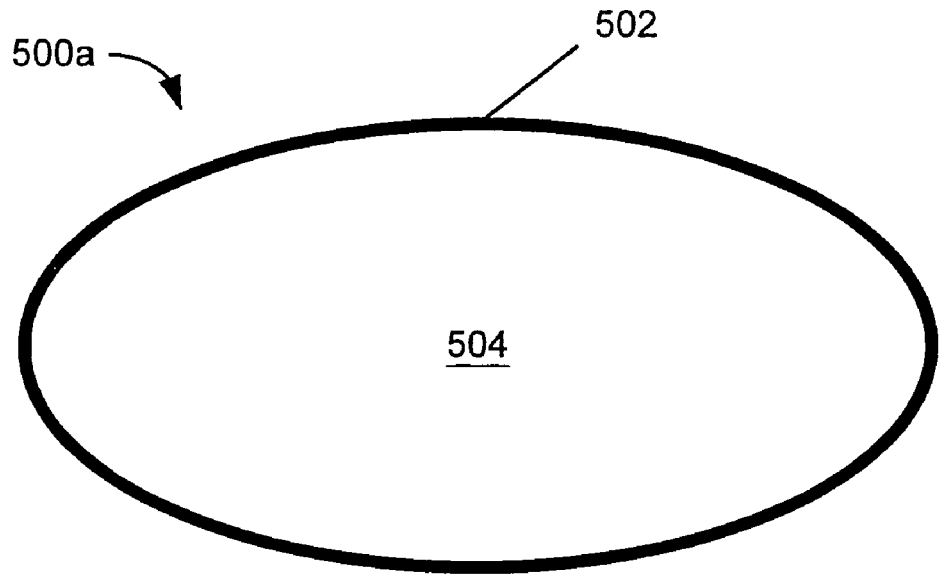
FIGS. 5A, 5B, 5C, 5D and 5E are cross-sectional views which illustrate five different embodiments of still another type of a corrosion protection system/device for tanks, containers, pipelines, semi-closed systems, and/or closed systems according to the present invention.
Figure 5B:
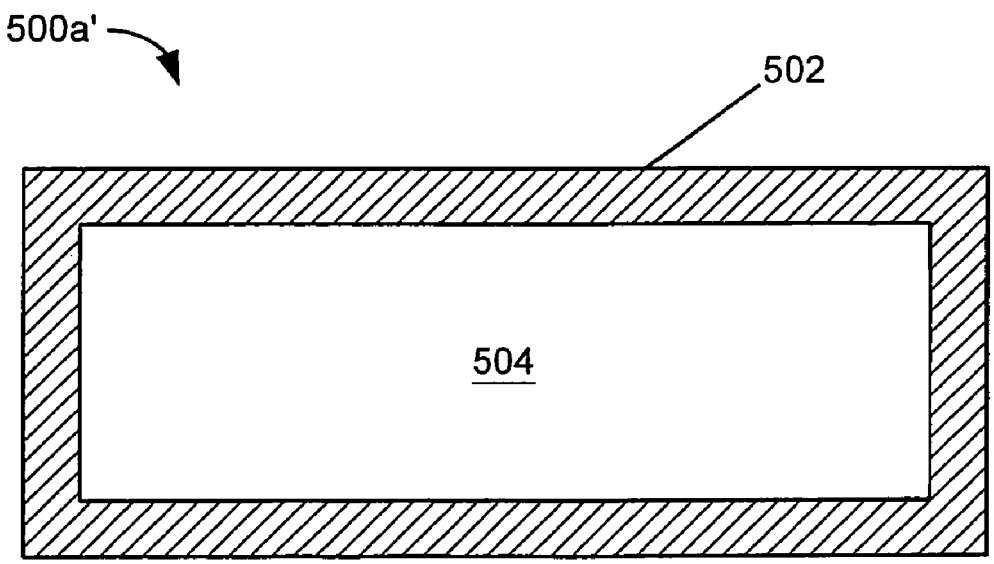

Referring to FIGS. 5A and 5B, devices 500a and 500a' are shown. In FIG. 5A, device 500a is formed from any suitable degradable material, as described above, which has been formed into a capsule 502 which contains at least one corrosion inhibitor 504. The corrosion inhibitor 504 may also contain other corrosion inhibitor, such as an inert gas (e.g., helium). In another embodiment, capsule 502 can contain only an inert gas rather than the combination of inert gas and corrosion inhibitor 504.

Given the intended use, capsule 502 may be of any shape or size as required. As shown in FIGS. 5A and 5B, capsule 502 may be elliptical or rectangular in shape, respectively. In the case where capsule 502 is formed from a degradable polymeric composition, the capsule 502 may be formed by any suitable technique including, but not limited to, extrusion, coextrusion, blow molding, casting or injection molding. In one embodiment, the capsule 502 can be formed from polymeric films which are joined through any suitable technique (e.g., heat sealed) to form the desired shape. In the case where capsule 502 is formed from a degradable metal (or a metal which corrodes easily), the capsule 502 may be formed by any suitable technique including, but not limited to, casting or injection molding.

Upon being exposed to a corrosive environment or element in a tank, container, pipeline, semi-closed system or closed system, capsule 502 undergoes degradation over time and releases into the environment corrosion inhibitor 504. As noted above, devices 500a and 500a' can be designed so as to retain their initial integrity over any given period of time. In another embodiment, devices 500a and 500a' further include a magnet (not pictured) for securing the device to any desired magnetic surface (e.g., the interior hull of the cargo compartment of an oil tanker).

Figure 5C:
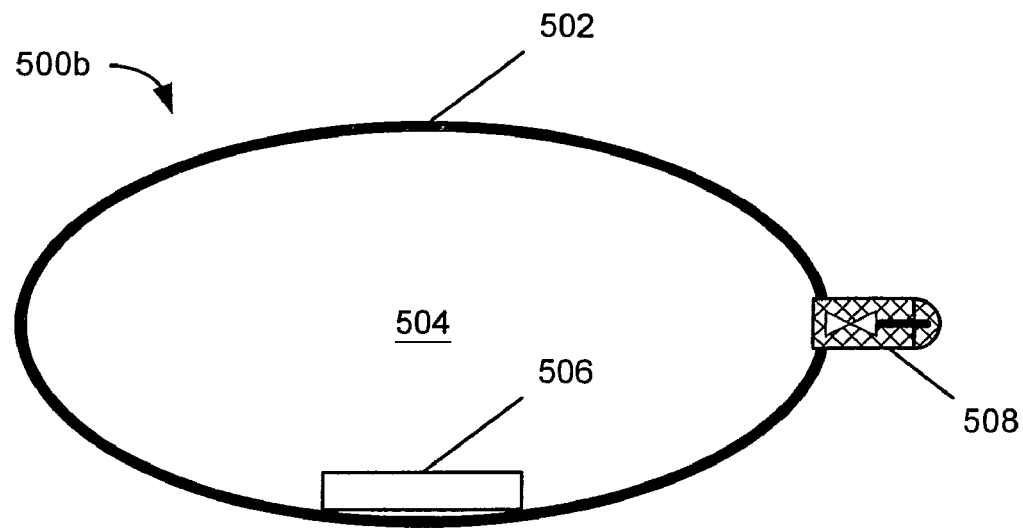
Figure 5D:
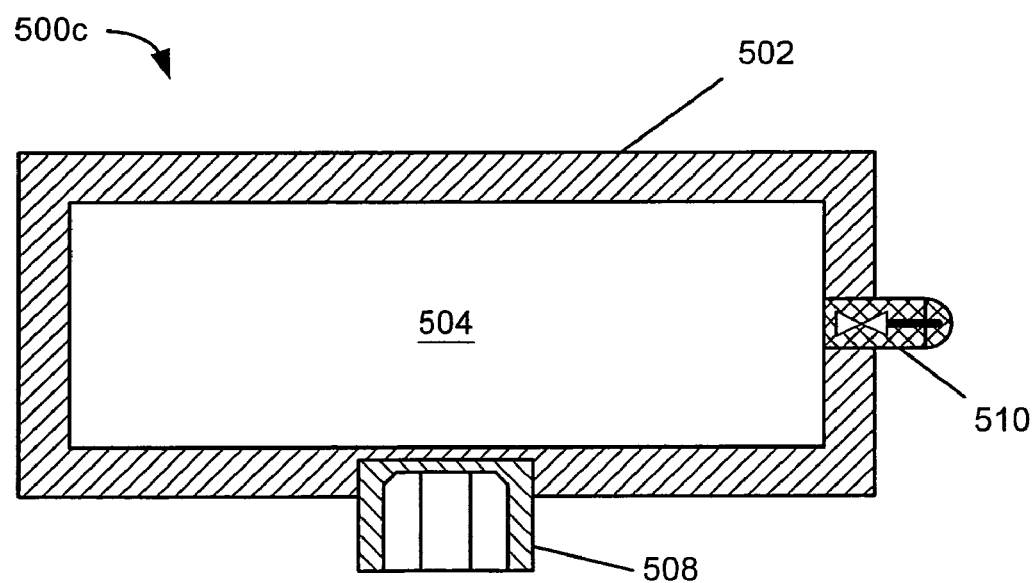

Referring to FIGS. 5C and 5D, FIGS. 5C and 5D depict two possible variations of devices 500a and 500a'. As shown in FIG. 5C, device 500b, which is similar to device 500a shown in FIG. 5A, includes a capsule 502 formed from any suitable material, at least one corrosion inhibitor 504, and a magnet 506. In this case, device 500b also includes a diaphragm valve 508 which permits corrosion inhibitor 504 to escape from capsule 502 into the surrounding environment. In one embodiment, diaphragm valve 508 permits the controlled release of corrosion inhibitor 504 during the time in which it takes capsule 502 to lose its integrity and release the remaining corrosion inhibitor 504. The magnet 506 can either be placed inside of capsule 502 (see FIG. 5B) or can be placed within the wall of capsule 502 (not shown). If the magnet 506 is placed inside of capsule 502, it is kept in place along the wall of capsule 502 by any suitable means (e.g., glue, epoxy, welding, etc.).

In another embodiment, capsule 502 can be formed from a non-degradable material and retain its structural integrity for any extended period of time (i.e., for more than 1 month). In one embodiment, capsule 502 can retain its structural integrity for about 1 month to about 25 years, or from about 6 months to about 10 years, or even from about 1 year to about 5 years. In this instance, diaphragm valve 508 can be any suitable valve which can be used to release corrosion inhibitor 504 on regular intervals or on an as needed basis. In still another embodiment, valve 508 can be used to replenish the corrosion inhibitor contained within capsule 502 once capsule 502 has become depleted. In such a case, a two way valve or a self-sealing diaphragm can be utilized for valve 508.

Alternatively, as is shown in FIG. 5D, if capsule 502 is formed from a non-degradable material, two or more valves can be included therein. In such a case at least one diaphragm valve 508 discharges, as desired, corrosion inhibitor 504 into the surrounding environment, and at least one valve 510 can be utilized to replenish the corrosion inhibitor 504 within capsule 502 once it has been expended.

Figure 5E:
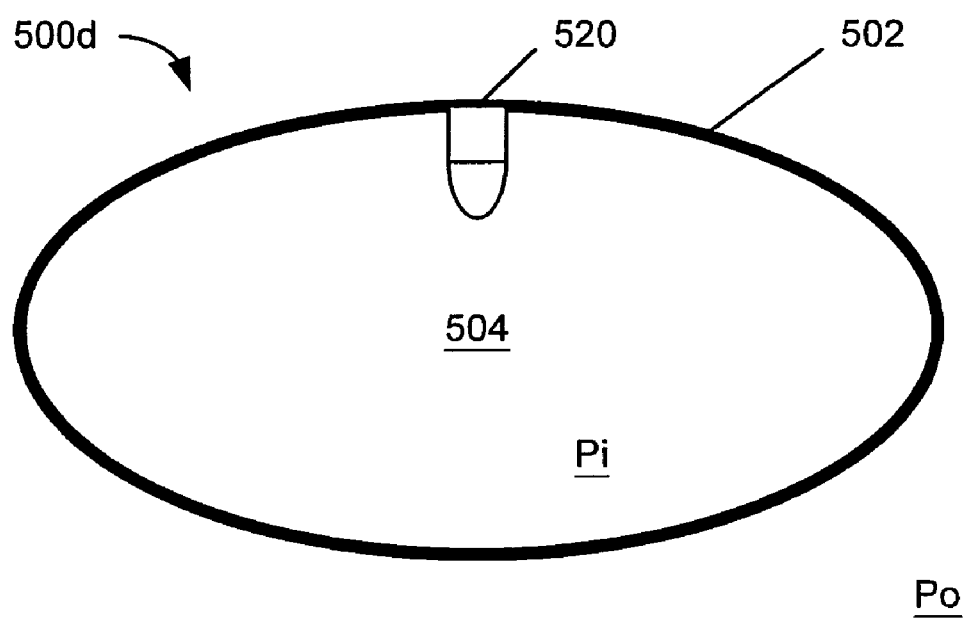

Referring to FIG. 5E, FIG. 5E depicts another possible variation of devices 500a, 500a', 500b and 500c. As shown in FIG. 5E, device 500d, which is similar to device 500a shown in FIG. 5A, includes a capsule 502 formed from any suitable material and at least one corrosion inhibitor 504. In this case, device 500d also includes a one way nipple valve 520 which permits corrosion inhibitor 504 to escape from capsule 502 into the surrounding environment when certain pressure criteria are met. For instance when the pressure outside ($P_o$) capsule 502 is less than or equal to the pressure within ($P_i$) capsule 502, then the one way nipple valve 520 is actuated and releases corrosion inhibitor 504. Conversely, when the pressure outside ($P_o$) capsule 502 is greater than the pressure within ($P_i$) capsule 502, then the one way nipple valve 520 remain sealed and corrosion inhibitor is not released into the surrounding environment. Device 500d is useful in situations where the cost of the delivery system for the corrosion inhibitor 504 is to be kept at a minimum since device 500d functions due to a difference in exterior versus interior pressure. In FIG. 5D, one way nipple valve 520 is shown in the open state.

Figure 6A:
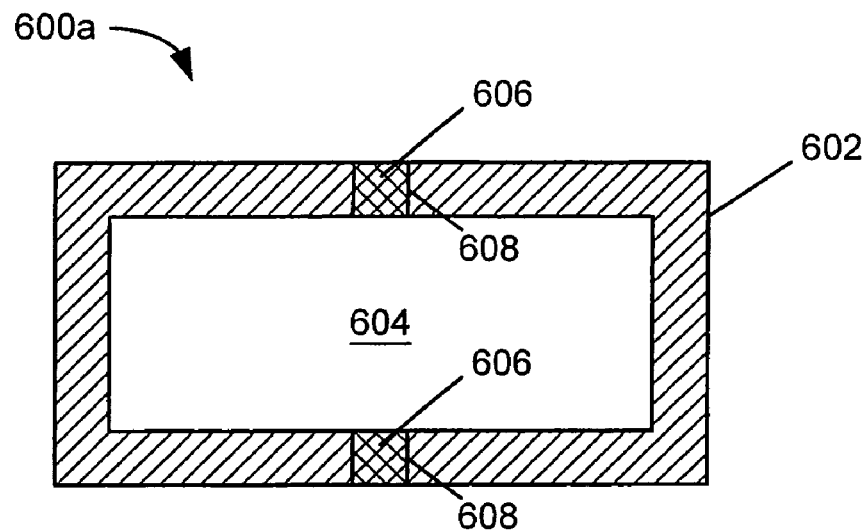
FIGS. 6A, 6B and 6C are cross-sectional views which illustrate three different embodiments of still another type of a corrosion protection system/device for tanks, containers, pipelines, semi-closed systems, and/or closed systems according to the present invention.

Referring to FIG. 6A, device 600a is shown. Device 600a includes a capsule 602 formed from any suitable non-degradable and/or corrosion resistant material. In one embodiment, capsule 602 is formed from any suitable metal (e.g., stainless steel, aluminum, etc.). In another embodiment, capsule 602 is formed from a suitable non-degradable polymer composition (e.g., a polyolefin polymer). The inside of capsule 602 includes at least one suitable corrosion inhibitor 604 which is selected based upon the corrosive element or compound to be neutralized. Capsule 602 has therein one or more degradable plugs 606 (two plugs are shown). Degradable plugs 606 can be formed from a degradable polymer composition or, alternatively, a metallic composition (e.g., magnesium, zinc or aluminum) which will degrade or react upon exposure to a given corrosive element or environment. Such degradation or reaction creates one or more openings 608 through which corrosion inhibitor 606 can escape from capsule 602. The choice of the composition used for plugs 606 depends upon the corrosive element or environment in which device 600a is to be utilized. In another embodiment, device 600a can further include a valve 610 which can be used to replenish the corrosion inhibitor 604 contained within capsule 602. Such a device is, for example, depicted in FIG. 6B.

Figure 6B:
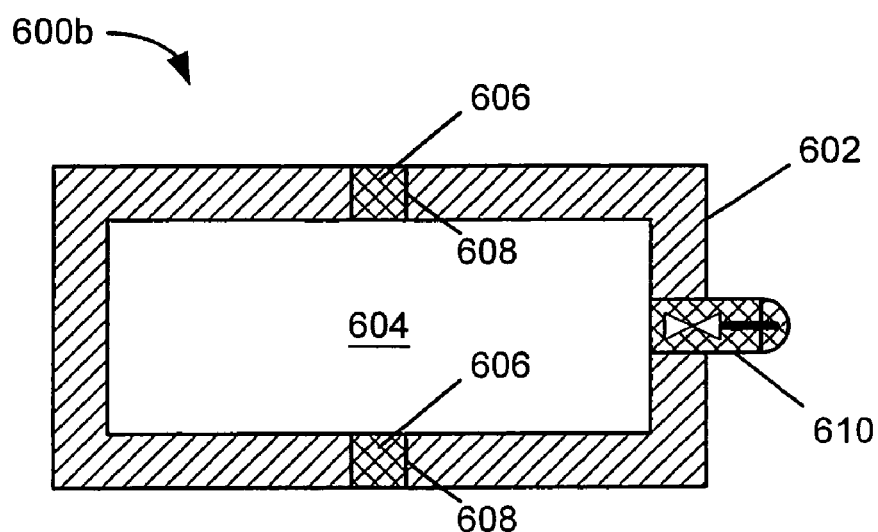

Referring to FIG. 6B, FIG. 6B depicts a device 600b which is similar in nature to device 600a of FIG. 6A except for the inclusion of valve 610. Device 600b can be reused by replacing degradable plugs 606 and then utilizing valve 610 to refill capsule 602 with corrosion inhibitor 604. In still another embodiment, device 600b further includes a diaphragm valve 612 which can be used to release, on a controlled basis, corrosion inhibitor 604 prior to degradation of degradable plugs 606. Such a device is, for example, depicted in FIG. 6C.

Figure 6C:
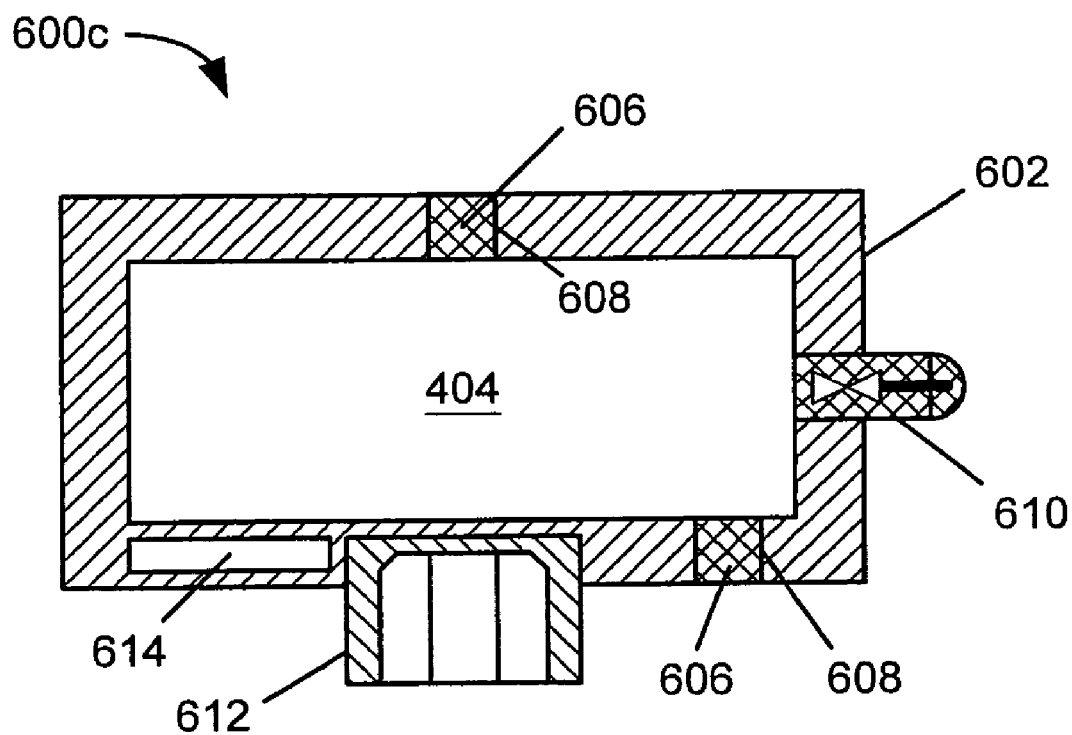

FIG. 6C depicts a device 600c which is similar in nature to device 600b of FIG. 6B except for the inclusion of diaphragm valve 612. In yet another embodiment, an optional magnet 614 can be placed within the structure of capsule 602 (or even inside capsule 602). In yet another embodiment, device 600c can just include diaphragm valve 612 and not valve 610.

Figure 7A:
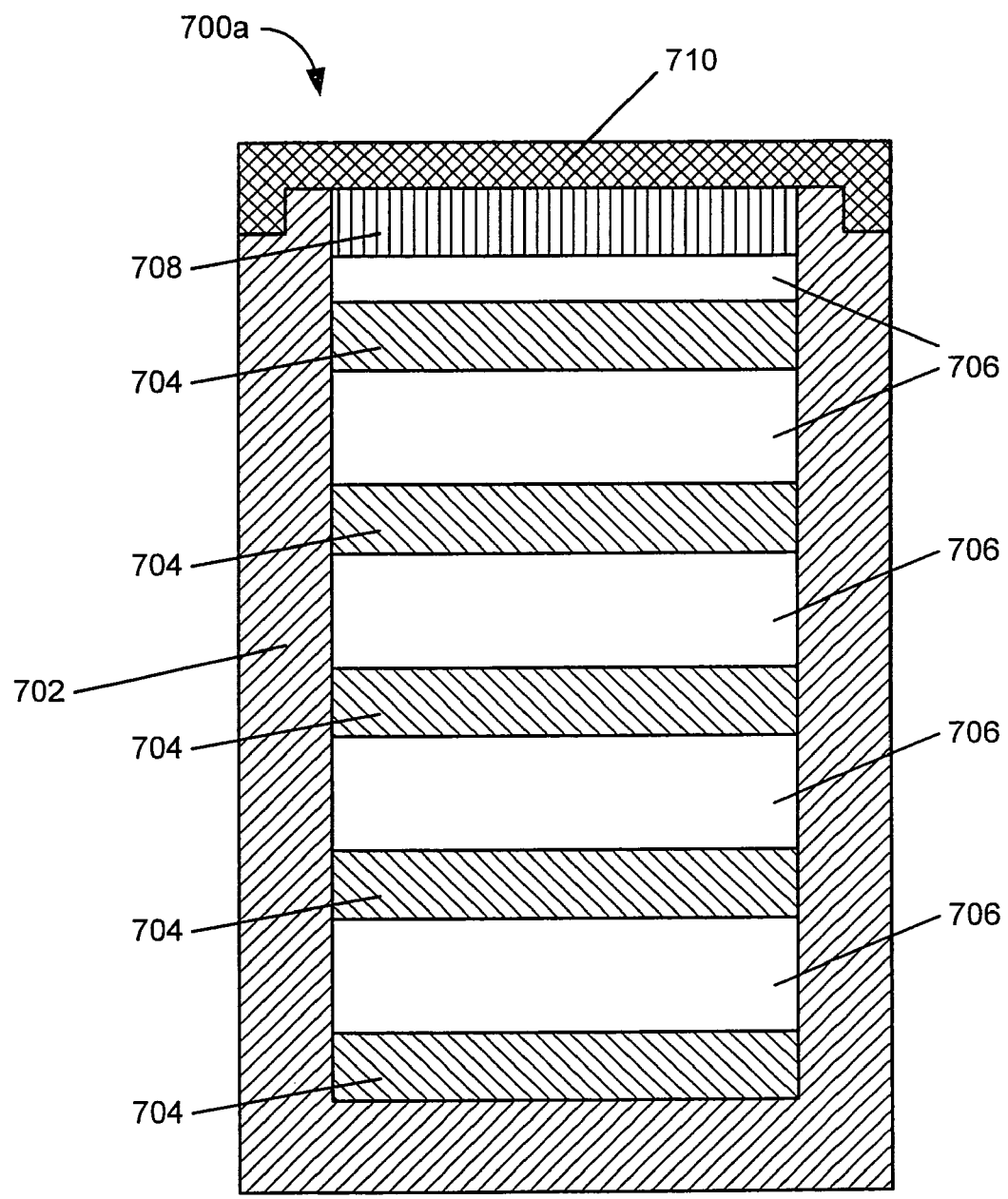
FIGS. 7A, 7B and 7C are cross-sectional views which illustrate three different embodiments of still another type of a corrosion protection system/device for tanks, containers, pipelines, semi-closed systems, and/or closed systems according to the present invention.

Referring to FIG. 7A, device 700a is shown. Device 700a includes a capsule 702 formed from any suitable non-degradable and/or corrosion resistant material. In one embodiment, capsule 702 is formed from any suitable metal (e.g., stainless steel, aluminum, etc.). In another embodiment, capsule 702 is formed from a suitable non-degradable polymer composition (e.g., a polyolefin polymer). Device 700a further includes alternating layers of degradable polymer 704 which contain at least one corrosion inhibitor therein; layers of degradable polymer 706 which contains no corrosion inhibitor therein, and a cover 710 which protects the layers of degradable polymer from degradation until device 700a is put into use.

The layers 704 and 706 can be any suitable thickness and can be arranged in any suitable manner. In one embodiment, the upper most layer is a degradable polymer layer 706 which contains no corrosion inhibitor therein.

Device 700a can optionally include a porous or semi-permeable membrane 708 which permits at least the corrosion inhibitor which is contained within the one or more degradable polymer layers 704 to escape from the interior of capsule 702.

Once the cover 710 is removed from device 700a and the device is placed inside of a desired tank, container, pipeline, semi-closed system or closed system, a corrosive element or environment which exists in the tank, container, pipeline, semi-closed system or closed system (or occurs over time) causes the degradation of the first layer of degradable polymer 706 which contain no corrosion inhibitor. After the first layer 706 degrades to such a point, the first layer of degradable polymer 704 which contains at least one corrosion inhibitor begins to degrade and release corrosion inhibitor from device 700a into the surrounding environment.

Figure 7B:
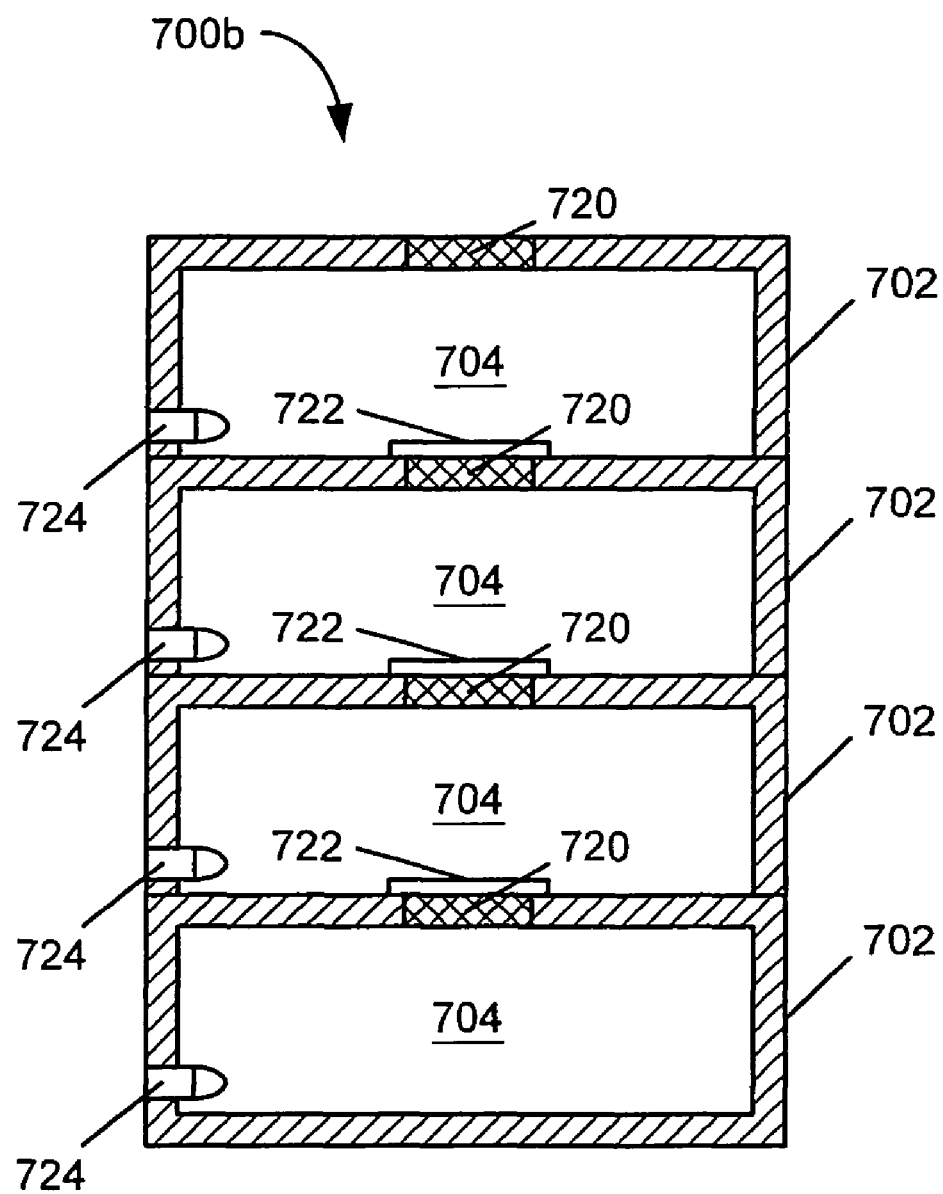

Referring to FIG. 7B, device 700b is shown. Device 700b includes two or more capsules 702 (four are shown) formed from any suitable non-degradable and/or corrosion resistant material. In one embodiment, capsules 702 are formed from any suitable metal (e.g., stainless steel, aluminum, etc.). In another embodiment, capsules 702 are formed from a suitable non-degradable polymer composition (e.g., a polyolefin polymer). In one embodiment, capsules 702 are connected together and share at least one common wall. Each of capsules 702 contain at least one corrosion inhibitor 704 and at least one degradable plug or cap 720. The degradable plug or cap 720 may further have thereover a degradable film 722 and may be formed from any suitable material (e.g., a degradable polymer).

In one embodiment, degradable plug or cap 720 degrades in the presence of a different compound than that of degradable film 722. For example, degradable plug or cap 720 can be designed to degrade in water, while degradable film 722 can be designed to degrade in oil or vice versa. Furthermore, device 700b may optionally include at least one valve 724 (e.g., a diaphragm or nipple valve) in one or more of the capsules 702. FIG. 7B includes therein an optional nipple valve 724 in each capsule 702.

Device 700b functions in a similar manner to that of device 700a, except for the fact that only degradable plugs or caps 720 and degradable films 722 degrade in the presence of one or more desired compounds. Additionally, valve 724 can be used either to release additional corrosion inhibitor from capsules 702, refill the corrosion inhibitor in the capsules 702, or both.

Figure 7C:
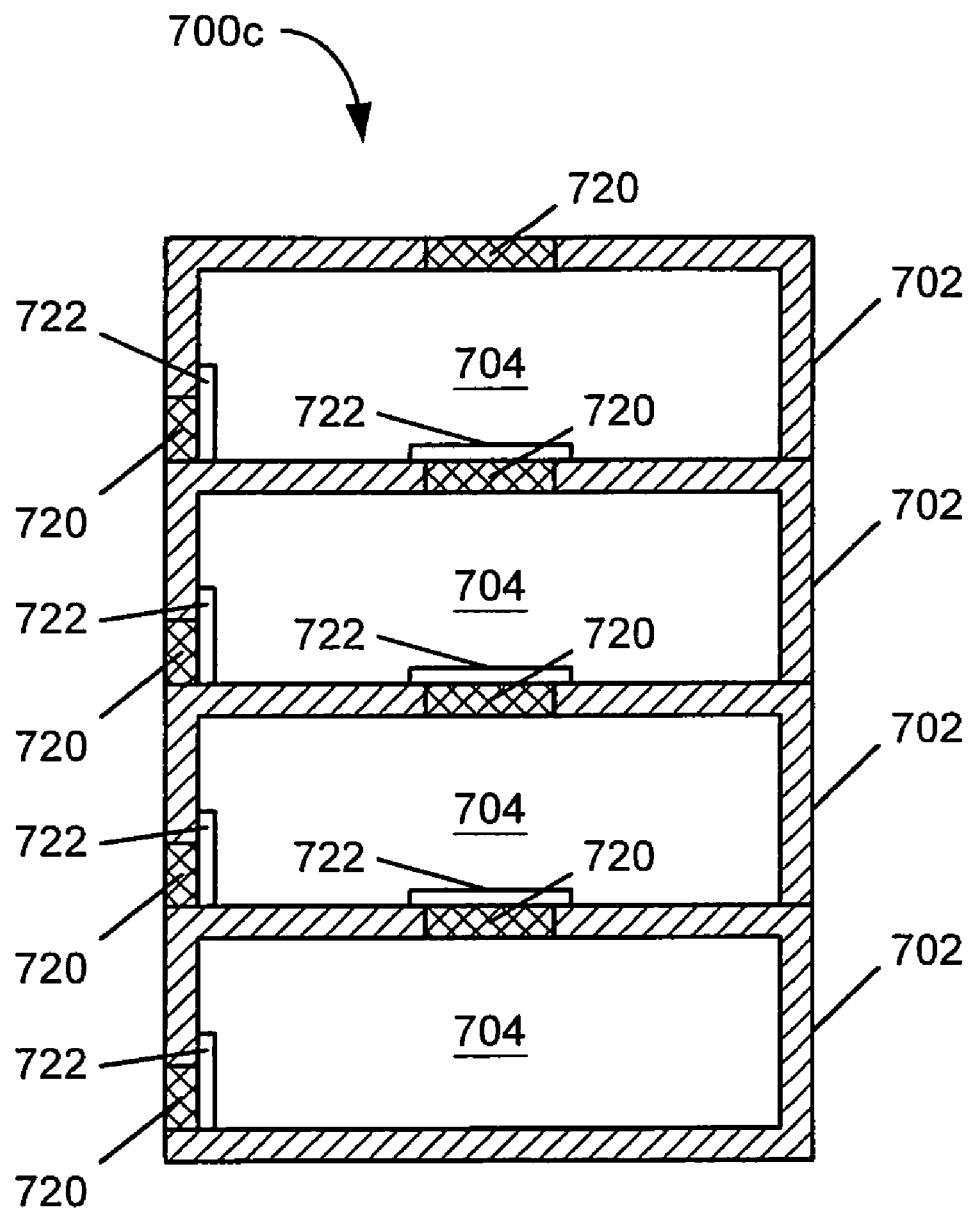

Turning to FIG. 7C, FIG. 7C depicts yet another variation of the devices of FIGS. 7A and 7B. Device 700c includes two or more capsules 702 (four are shown) formed from any suitable non-degradable and/or corrosion resistant material. In one embodiment, capsules 702 are formed from any suitable metal (e.g., stainless steel, aluminum, etc.). In another embodiment, capsules 702 are formed from a suitable non-degradable polymer composition (e.g., a polyolefin polymer). In one embodiment, capsules 702 are connected together and share at least one common wall. Each of capsules 702 contain at least one corrosion inhibitor 704 and at least two degradable plugs or caps 720. At least one of the degradable plugs or caps 720 may further have thereover a degradable film 722 and may be formed from any suitable material (e.g., a degradable polymer).

In one embodiment, each degradable plug or cap 720 degrades in the presence of a different compound than that of degradable film 722. For example, degradable plug or cap 720 can be designed to degrade in water, while degradable film 722 can be designed to degrade in oil or vice versa. Furthermore, although not pictured, device 700c may optionally include at least one valve (e.g., a diaphragm or nipple valve) in one or more of the capsules 702 similar to that explained with regard to the embodiment of FIG. 7B.

Device 700c functions in a similar manner to that of device 700b, except for the fact that only degradable plugs or caps 720 and degradable films 722 degrade in the presence of one or more desired compounds. Additionally, if present, the one or more valves can be used either to release additional corrosion inhibitor from capsules 702, refill the corrosion inhibitor in the capsules 702, or both.

Figure 8A:
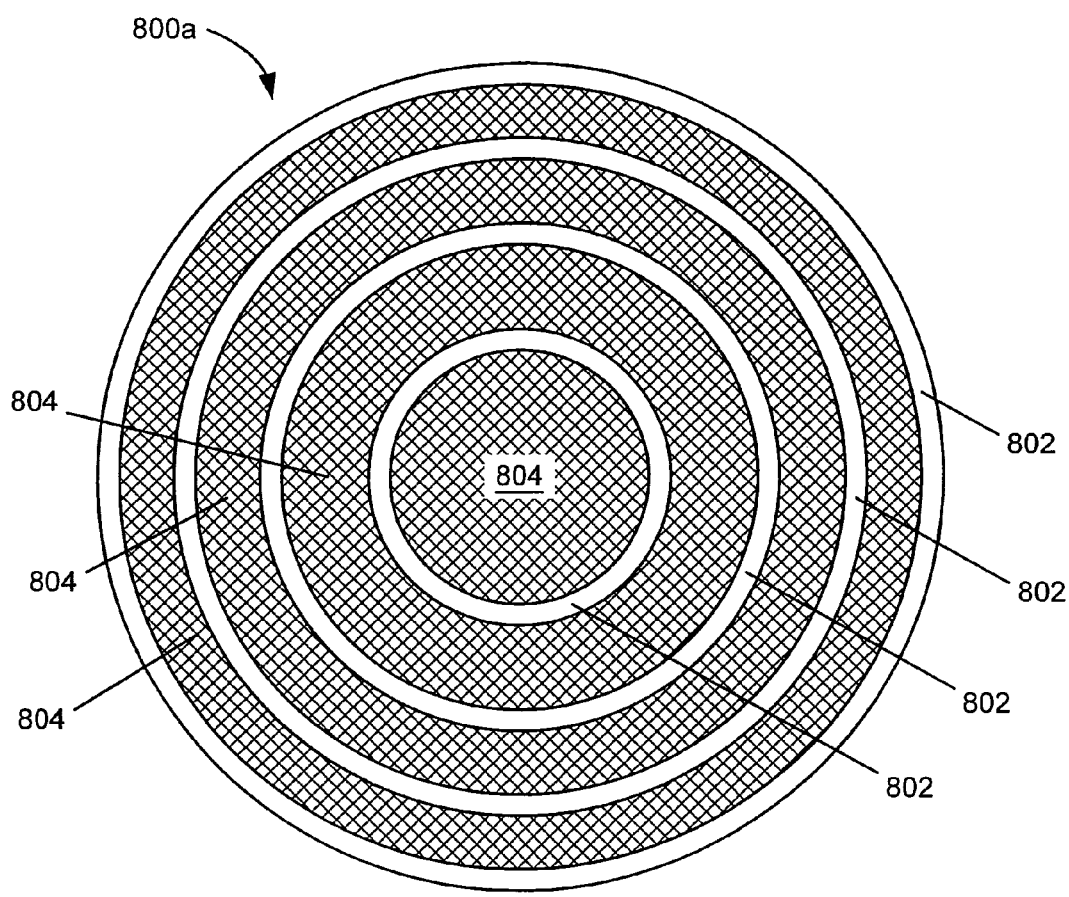
FIGS. 8A, 8B and 8C are cross-sectional views which illustrate three different embodiments of still another type of a corrosion protection system/device for tanks, containers, pipelines, semi-closed systems, and/or closed systems according to the present invention.
Figure 8B:
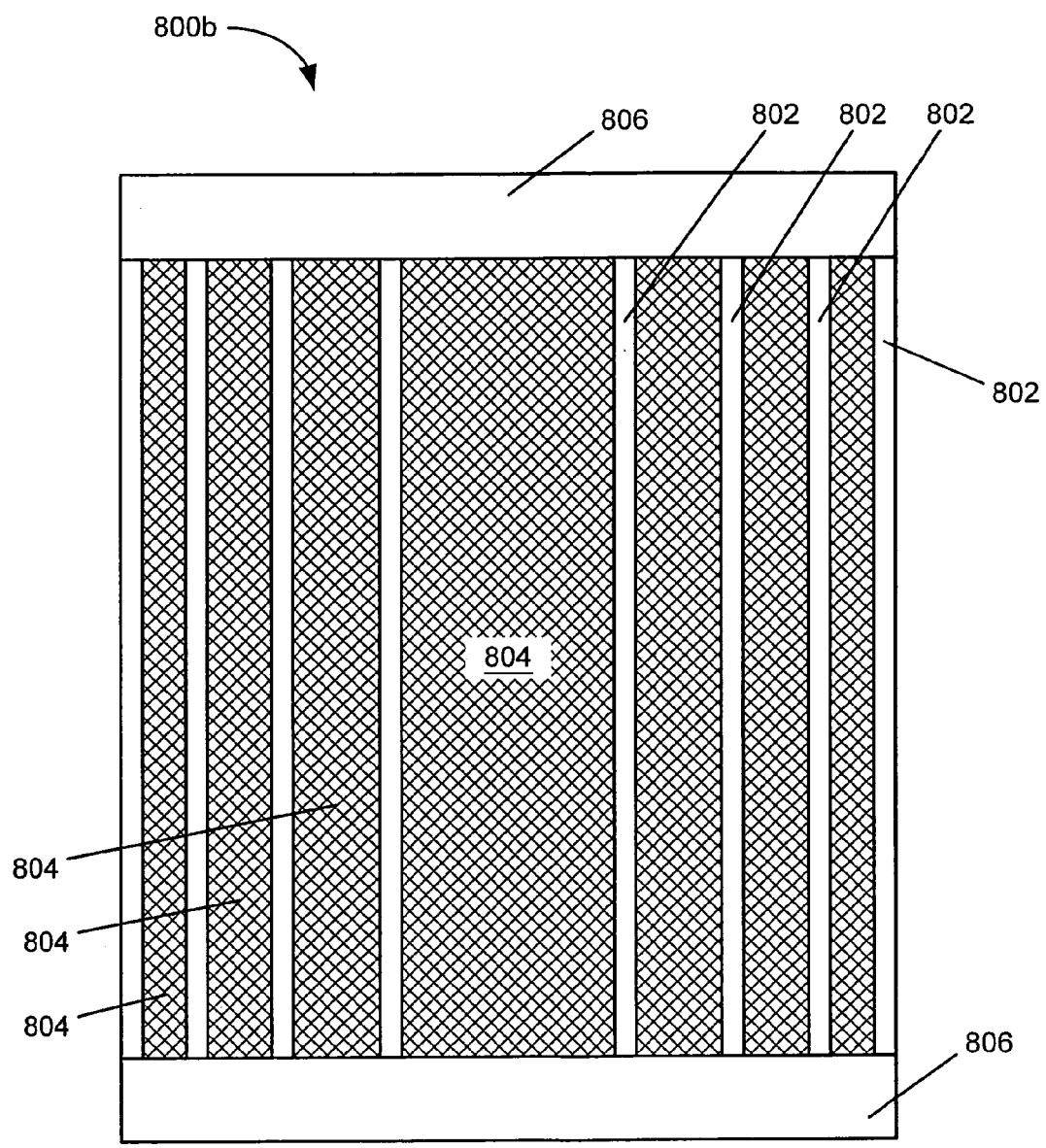
Figure 8C:
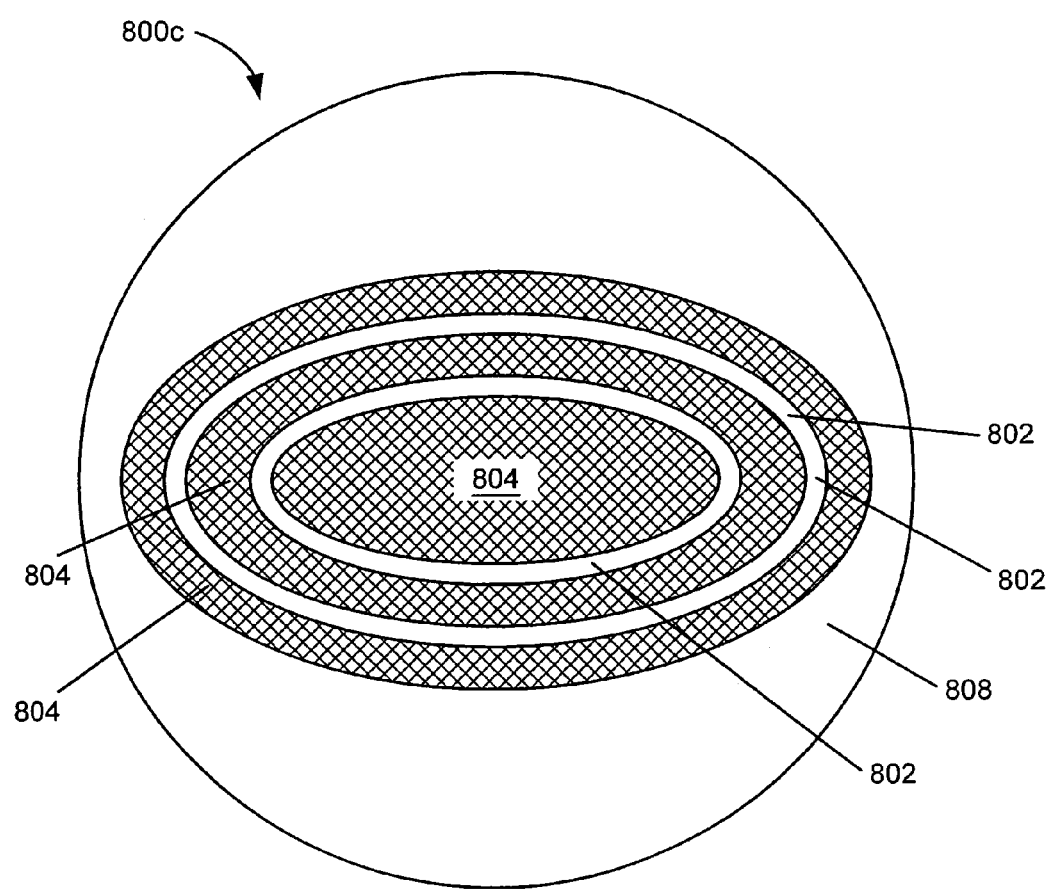

Referring to FIGS. 8A to 8C, devices 800a, 800b and 800c are shown. Devices 800a, 800b and 800c are similar in nature except for their shapes and/or sizes. All three of the devices, 800a, 800b and 800c include degradable polymer layers 802 which contain no corrosion inhibitor and polymer layers 804 which contain at least one corrosion inhibitor. Both polymer layers 802 and 804 can be formed from the same or different suitable degradable polymer materials. In one embodiment, the layers 802 and 804 are formed from a polymer material that degrades in the presence of one or more of water, oil, hydrogen chloride, hydrogen sulfide, sulfur dioxide, nitric oxide, $NO_x$, chloride ions or oxygen.

As shown in FIGS. 8A to 8C, layers 802 and 804 are formed in an alternating manner. In one embodiment, a layer 802 is the outer layer. In another embodiment, a layer 804 is the outer layer. Furthermore, devices 800b and 800c include therein one or more caps 806 or outer layer 808 formed from a degradable polymer which contains no corrosion inhibitor. The thickness of such any caps 806 and/or outer layers 808 which may be present is not critical. These one or more caps 806 or outer layers 808 function to delay the degradation of layers 804 and can, in some circumstances, lead to an extended service life of devices 800b and 800c. Accordingly, in practice the thickness of any caps 806 and/or outer layers 808 which may be present is determined by the length of delay desired.

In one embodiment, each of the one or more layers 804 have equal volumes and therefore should take almost the same amount of time to degrade, thereby providing the same amount of service life per layer. In another embodiment, each of the one or more layers 804 have different volumes as desired for the application. In this case, each layer will, in most circumstances, have different degradation times and service lives. This discussion also applies to layers 802.

The devices of FIGS. 8A to 8C are utilized by placing one or more devices into the inside of a desired tank, container, pipeline, semi-closed system or closed system, where a corrosive element or environment exists. Upon exposure to such an element or environment, the devices of FIGS. 8A to 8C begin to degrade.

Figure 9:
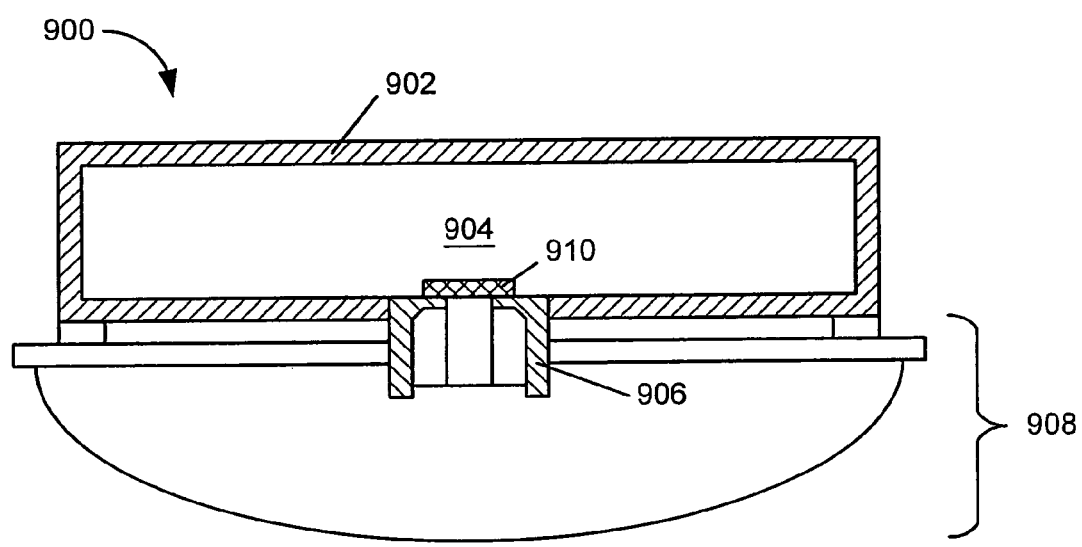
FIG. 9 is a cross-sectional view which illustrates an embodiment of still another type of a corrosion protection system/device for tanks, containers, pipelines, semi-closed systems, and/or closed systems according to the present invention.

Referring to FIG. 9, FIG. 9 depicts a device 900 according to another embodiment of the present invention where a capsule 902 containing one or more corrosion inhibitors 904 is connected via a delivery means 906 to a semi-permeable or permeable bag or flexible container 908 which is connected through any suitable means to capsule 902. Device 900 can further include a degradable membrane 910 which, until degraded, maintains the integrity of the enclosure of capsule 902 and ensures that corrosion inhibitor 904 remains in capsule 902 until required.

Depending upon the nature of delivery means 906, degradable membrane 910 may or may not be required in order for the device to function as intended. For example, if delivery means 906 is a one way valve or an automatically controlled. Two-way valve, degradable membrane 910 may not be required. In another embodiment, delivery means 906 can be a nipple or a diaphragm as discussed above.

Capsule 902 is formed from any suitable non-degradable material and/or corrosion resistant material. In one embodiment, capsule 902 is formed from any suitable metal (e.g., stainless steel, aluminum, etc.). In another embodiment, capsule 902 is formed from a suitable non-degradable polymer composition (e.g., a polyolefin polymer). In another embodiment, device 900 can further include one or more valves, as discussed above, which permit device 900 to be reused by refilling the device with corrosion inhibitor after it has become depleted.

The device of FIG. 9 is utilized by placing one or more devices into the inside of a desired tank, container, pipeline, semi-closed system or closed system, where a corrosive element or environment exists. Upon exposure to such an element or environment, the degradable membrane 910 begins to degrade and eventually permits the release of corrosion inhibitor.

Figure 10:
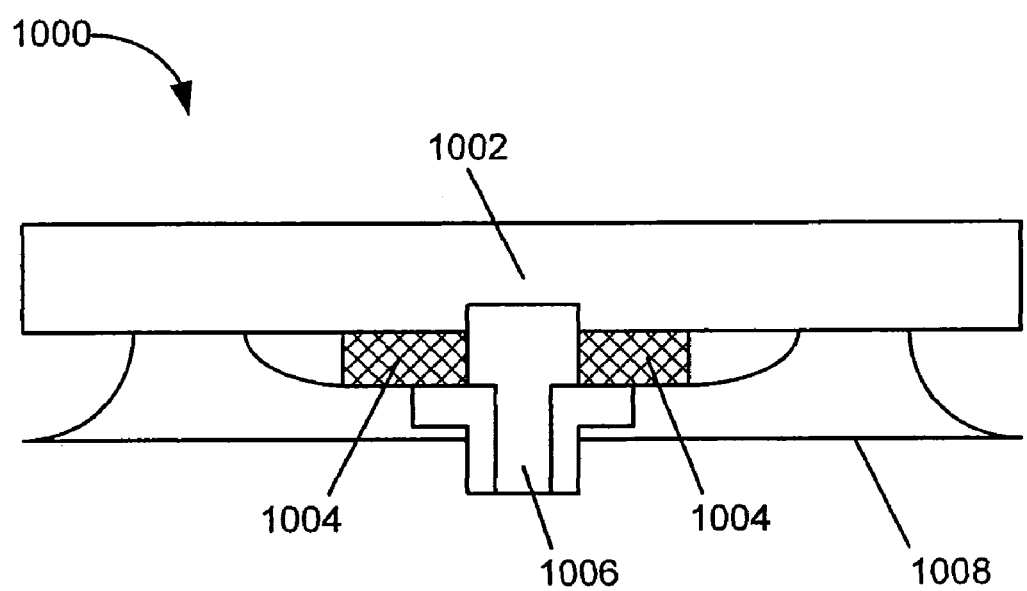
FIG. 10 is a cross-sectional view which illustrates an embodiment of still another type of a corrosion protection system/device for tanks, containers, pipelines, semi-closed systems, and/or closed systems according to the present invention.

Referring to FIG. 10, FIG. 10 depicts a device 1000 according to another embodiment of the present invention where a capsule 1002 containing one or more corrosion inhibitors 1004 is placed within a cap or tank lid (e.g., a fuel tank cap) which also contains therein a delivery means 1006 for delivering corrosion inhibitor 1004 into a tank or fuel system. Device 1000 further contains an engaging flange 1008 for engaging the opening in the fuel tank or fuel system. The delivery means 1006 can be any suitable delivery means as discussed above. For example, in one embodiment, delivery means 1006 is a one way valve. The device of FIG. 10 is utilized by using device 1000 as the cap or cover of a suitable tank, container, pipeline or semi-closed system.

Figure 11A:
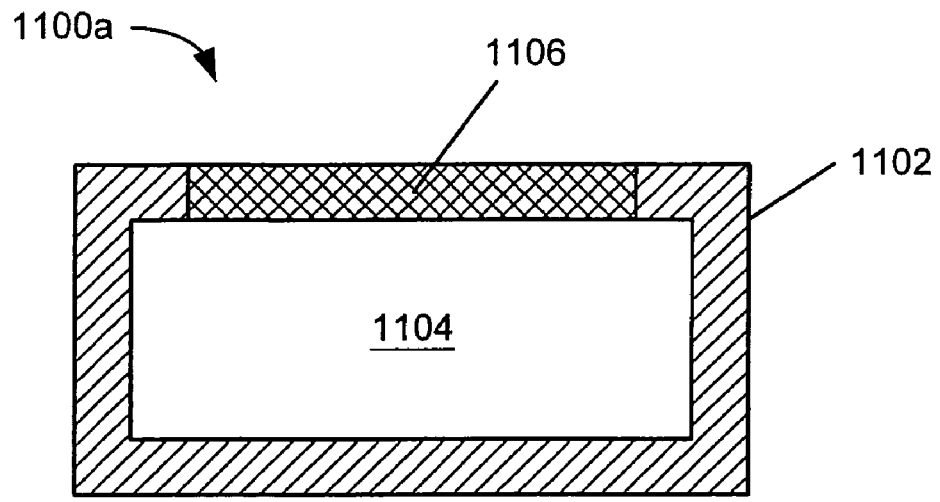
FIGS. 11A and 11B are cross-sectional views which illustrate two different embodiments of still another type of a corrosion protection system/device for tanks, containers, pipelines, semi-closed systems, and/or closed systems according to the present invention.
Figure 11B:
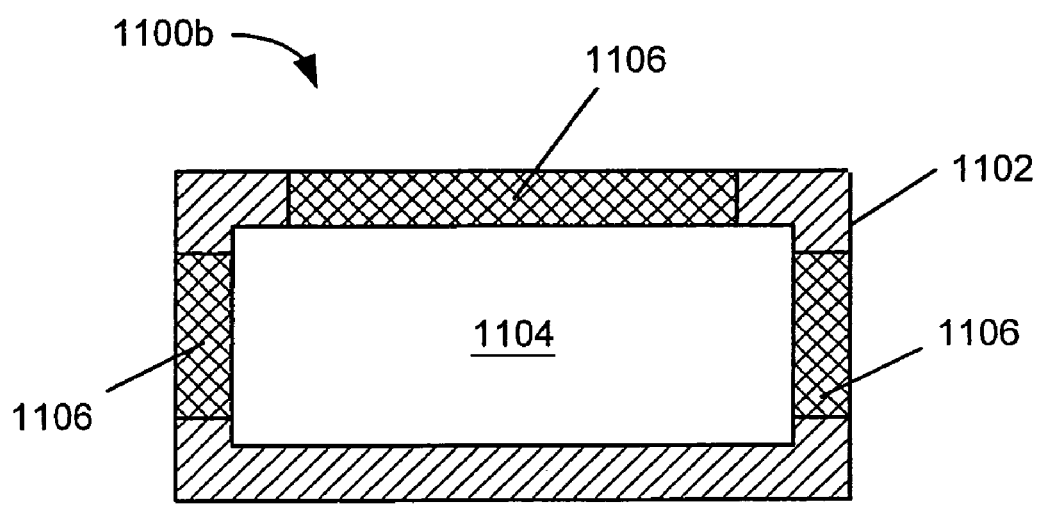

Referring to FIGS. 11A and 11B, FIGS. 11A and 11B depict yet another embodiment according to the present invention. The device 1100a of FIG. 11A includes a capsule 1102 formed of any suitable material. In one embodiment, capsule 1102 is formed from any suitable non-degradable or corrosion resistant metal (e.g., stainless steel, aluminum, etc.). In another embodiment, capsule 1102 is formed from a suitable non-degradable polymer composition (e.g., a polyolefin polymer). Although depicted as rectangular, capsule device 1100a can be made in any shape (e.g., spherical, square, pyramidal, etc.). The inside of capsule 1102 includes at least one suitable corrosion inhibitor impregnated foam 1104 which contains one or more corrosion inhibitors which are selected based upon the corrosive element or compound to be neutralized. The capsule 1102 also includes a venting portion 1106 which is permeable to the corrosion inhibitor impregnated in foam 1104 and allows the one or more corrosion inhibitors contained in foam 1104 to escape into the environment outside of capsule 1102.

This embodiment is not limited to the configuration depicted in FIG. 11A, rather any shape of corrosion inhibitor impregnated with foam 1104 can be placed into the interior of capsule 1102. Additionally, device 1100a can further contain a cover which acts to seal venting portion 1106 and prevent escape of the corrosion inhibitor contained in foam 1104 until desired. The cover can be made of any suitable material (e.g., a polymeric adhesive label, etc.).

In the embodiment of FIG. 11B, device 1100b is similar to device 1100a except for the addition of more than one venting portion 1106 (in this case three, although any number could be used). In this embodiment, one or all of the venting portions 1106 can be covered with a cover to prevent the early release of the corrosion inhibitor contained in the foam 1104.

Figure 12A:
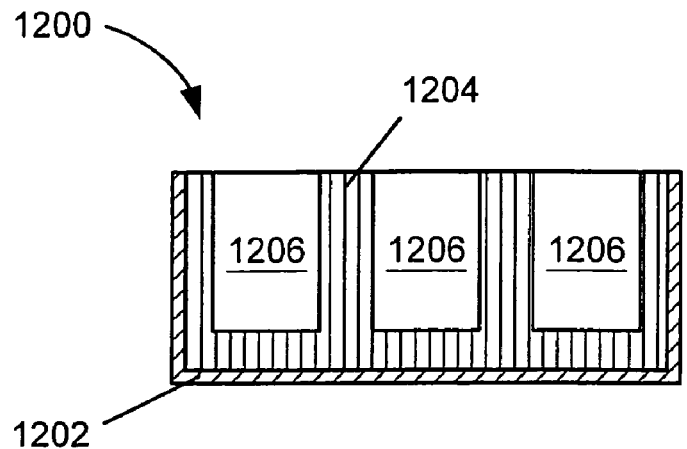
FIGS. 12A and 12B are cross-sectional and top views, respectively, which illustrates still another type of a corrosion protection system/device for tanks, containers, pipelines, semi-closed systems, and/or closed systems according to the present invention.
Figure 12B:
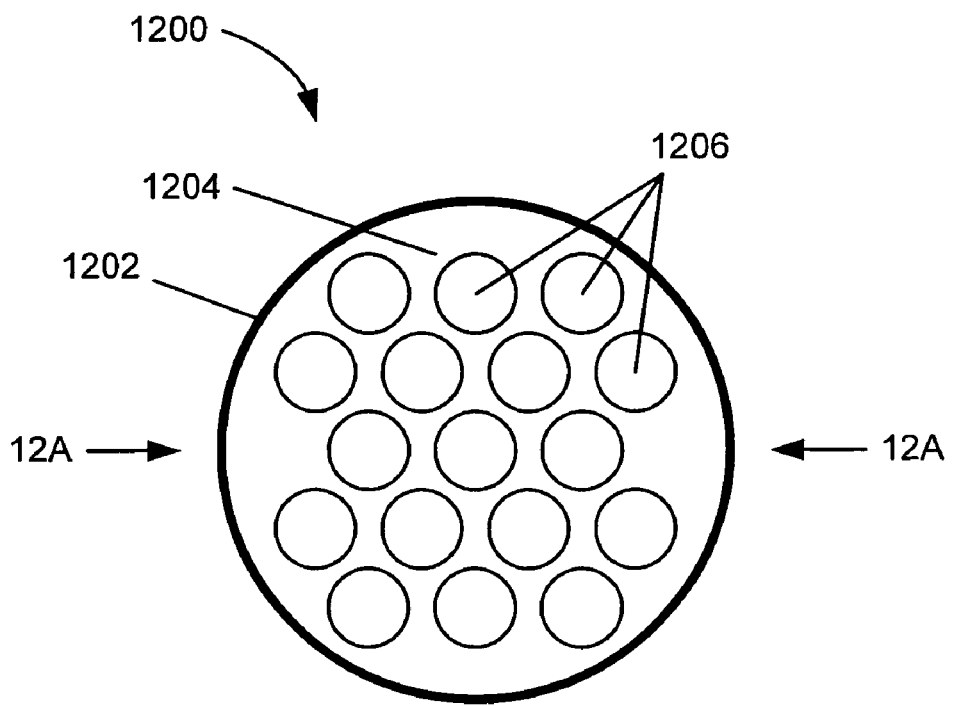

Referring to FIGS. 12A and 12B, FIGS. 12A and 12B depict a device 1200 according to another embodiment of the present invention. Although device 1200 is shown as a three dimensional disc-shaped object, device 1200 can be designed so as to be any shape. Such shapes include, but are not limited to, circular, spherical, rectangular, polygonal, cylindrical, cubic, triangular, pyramidal, disc-shaped, etc. Device 1200 includes a shell 1202 formed from any suitable material and a VCI-containing foam portion 1204.

In one embodiment, shell 1202 can be formed from any suitable metal (e.g., aluminum, steel, stainless steel, tin, nickel, etc.) or any suitable polymer composition. Such polymers include, but are not limited to, polyolefin polymers, polyamides, polyimides, PET, ABS, polyurethanes, polyacrylates, and polymethacylates.

Exemplary polyolefins include, but are not limited to, polyethylenes, polypropylenes, polybutenes and polyisoprenes. In another embodiment, polymers such as ethylene/vinyl acetate copolymers, ethylene/vinyl chloride copolymers, polyvinyl chloride polymers, polyurethane polymers, polyester polymers, polyacrylic polymers (both crosslinked and non-crosslinked) and copolymers of one or more of the above can be utilized in the present invention as a carrier and/or as the polymer article forming portion of the present invention. Such copolymers could include two or more of the same type of monomer, for example, two or more different olefins.

In yet another embodiment, the shell 1202 portion of device 1200 is formed from a biodegradable polymer. Any polymer which exhibits biodegradability can be utilized in conjunction with the present invention. Examples of suitable biodegradable polymers include, but are not limited to, biodegradable polyesters (e.g., linear poly .epsilon.-carpolactone (PCL)), biodegradable polylatic acid polymers, biodegradable polyester amide polymers, biodegradable polyester urethane polymers and biodegradable copolymers or any combination of two or more of the above. Such copolymers could include two or more of the same type of polymer, for example, two or more different biodegradable polyesters.

In yet another embodiment, shell 1202 can be formed from a suitable thermosetting polymer composition. Such compositions include, but are not limited to, phenolic polymers, amino resins, polyesters, epoxides and silicones.

The VCI-containing foam 1204 can be formed from any suitable polymer material to which a VCI composition, as discussed above, has been added. The polymer composition is then processed into any suitable foam using techniques known in the art and a suitable amount of foam is placed into shell 1202 using any suitable technique (e.g., by hand or an automated technique).

As is depicted in FIGS. 12A and 12B, device 1200 can optionally include one or more holes 1206 formed in the VCI-containing foam. The one or more holes 1206 act to increase the surface area and reduce the mass of device 1200. This in turn permits a more effective release of the VCI contained in the VCI-containing foam 1204. Holes 1206 can be any suitable size or shape. In one embodiment, the holes 1206 are circular in shape and have a diameter of about 0.01 to about 20 mm, or about 0.1 mm to about 12 mm, or even about 1 mm to about 6 mm.

As an example, when device 1200 is disc shaped with a diameter of 48 mm and a height of 22 mm, the surface area of device 1200 can be increased almost 4 fold by placing therein circular holes 1206 which are 3 mm in diameter, or by 7 fold by placing therein circular holes 1206 which are 1 mm in diameter.

In another embodiment, device 1200 can be formed in any shape or configuration which yields a high ratio of surface area to weight. For example, device 1200 could be designed in the form of a computer heat sink or a honey comb structure. By increasing the surface area of device 1200 relative to its weight, a device according to the present invention yields a corrosion inhibiting device which enables a higher emission rate of VCI. When such a device is placed into a desired enclosure and the enclosure is sealed, a device 1200 according to the present invention causes the enclosed space to become saturated with VCI in a shorter period of time, thereby providing quicker and more effective protection of any article contained therein.

In yet another embodiment, device 1200 does not need to be formed using a VCI-containing foam, instead other alternatives for this portion of device 1200 could be utilized. For example, VCI-containing foam 1204 could be replaced by a VCI-containing polymer composition (e.g., a polyolefin polymer).

It should be noted, that in any of the devices according to the present invention, the corrosion inhibitor component thereof can be replaced by a combination of corrosion inhibitor and an inert gas (e.g., helium) as needed. Also, in general, any of the devices described above with reference to the Figures are intended to be placed inside of a tank, container, semi-closed system or closed system. Alternatively, such devices can be designed to fit into, if present, the lid, cover and/or hatch of any tank, container, semi-closed system or closed system. Any of these devices can further be attached permanently or semi-permanently to the inside of a tank, container, semi-closed system or closed system via any suitable means (e.g., rivets, screws, bolts, welded, etc.).

Furthermore, where applicable, a device of the present invention which utilizes therein one or more degradable polymer compositions can be designed so as to yield controlled degradation based upon the environment into which the device of the present invention is to be placed. For example, a device according to the present invention could be designed so as to contain a polymer composition which has a limited solubility in a given environment. Such a design scenario would permit the present invention to yield devices which degrade very slowly in a given environment. Alternatively, select portions of a device according to the present invention may be designed so as to be degradable in a given environment.

With regard to the non-degradable polymer portions of any one of the devices according to present invention, it should be noted that just because these portions are not designed to degrade in a given environment, it does not mean that such non-degradable polymer portions cannot be formed so as to be bio-degradable once the service life of the device has ended and the device has been committed to a suitable waste disposal site. Thus, the bio-degradation rate of the non-degradable portions of any one of the devices of the present invention can be selected so as not to adversely impact the service life of a device according to the present invention.

Although the invention has been shown and described with respect to certain embodiments, it is obvious that equivalent alterations and modifications will occur to others skilled in the art upon the reading and understanding of this specification. In particular with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method for protecting a tank, container, pipeline, semi-closed system or closed system comprising the steps of:
   (A) placing a vapor phase corrosion inhibiting device in a lid, cap, cover, or hatch in communication with a tank, container, pipeline, semi-closed system or closed system; wherein the vapor phase corrosion inhibiting device comprises;
   a capsule having at least one sealable enclosure therein;
   at least one biodegradable polymer layer which contains therein at least one vapor phase corrosion inhibitor, which is located within the sealable enclosure of the capsule; and
   at least one degradable layer which contains no vapor phase corrosion inhibitor_therein which is located within the sealable enclosure of the capsule;
   wherein the at least one degradable layer which contains at least one vapor phase corrosion inhibitor and the at least one degradable layer which contains no vapor phase corrosion inhibitor are formed in alternating layers with the proviso that at least one degradable layer which contains no vapor phase corrosion inhibitor is the outermost layer within the corrosion inhibiting device; and
   (B) closing car sealing the tank, container, pipeline, semi-closed system or closed system.

2. The method of claim 1, wherein the at least one degradable layer that contains no vapor phase corrosion inhibitor is formed from a biodegradable polymer.

3. A method for protecting a tank, container, pipeline, semi-closed system or closed system comprising the steps of:
   (A) placing a corrosion inhibiting device completely into the interior of a tank, container, pipeline, semi-closed system or closed system, wherein the corrosion inhibiting device comprises a self-contained corrosion inhibiting capsule, the self-contained corrosion inhibiting capsule comprising:

a capsule having at least one sealable enclosure therein; at least one biodegradable layer which contains therein at least one corrosion inhibitor which is located within the sealable enclosure of the capsule; and at least one biodegradable polymer layer which contains no corrosion inhibitor_therein which is located within the sealable enclosure of the capsule;

wherein the at least one biodegradable layer which contains at least one corrosion inhibitor and the at least one biodegradable layer which contains no corrosion inhibitor are formed in alternating layers with the proviso that at least one degradable layer which contains no corrosion inhibitor is the outermost layer within the self-contained corrosion inhibiting capsule; and (B) closing or sealing the tank, container, pipeline, semi-closed system or closed system.

4. A method for providing corrosion protection to a container subject to corrosion comprising the steps of:

(A) providing a corrosion inhibitor device, and a sealable enclosure within the device, said sealable enclosure comprising a degradable polymer layer having a vapor phase corrosion inhibitor, and wherein the device further comprises a delivery means for achieving the selective and controlled release of the vapor phase corrosion inhibitor;

(B) placing the device into communication with the interior of the container subject to corrosion; and (C) permitting the delivery means to selectively control the release of the vapor phase corrosion inhibitor into the container subject to corrosion.

5. The method of claim 4, wherein said degradable polymer layer is formed from a biodegradable polymer.

6. A method for providing corrosion protection to a container subject to corrosion comprising the steps of:

(A) providing a device having a sealable enclosure within the device, wherein said sealable enclosure comprises at least one degradable polymer layer containing a vapor phase corrosion inhibitor therein, wherein the device further comprises a delivery means for achieving the selective and controlled release of the vapor phase corrosion inhibitor;

(B) placing the device within the container subject to corrosion; and (C) permitting the delivery means to selectively control the release of the vapor phase corrosion inhibitor into the container subject to corrosion.

7. The method of claim 6, wherein the device is placed within the container subject to corrosion by attachment to a lid, cap, cover or hatch of the container.

8. The method of claim 6, wherein the delivery means comprises one or more of a one-way diaphragm, a two-way diaphragm, a semipermeable membrane, a pressure-sensitive valve, an electronic valve, a decomposable metal or polymeric plug, or a decomposable polymer impregnated with the vapor phase corrosion inhibitor.

* * * * *